(12) United States Patent
Tachibana et al.

(10) Patent No.: US 7,606,388 B2
(45) Date of Patent: Oct. 20, 2009

(54) CONTENTS BORDER DETECTION APPARATUS, MONITORING METHOD, AND CONTENTS LOCATION DETECTION METHOD AND PROGRAM AND STORAGE MEDIUM THEREFOR

(75) Inventors: Ryuki Tachibana, Yokohama (JP); Seiji Kobayashi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/477,243

(22) PCT Filed: May 14, 2002

(86) PCT No.: PCT/JP02/04671

§ 371 (c)(1),
(2), (4) Date: Oct. 18, 2007

(87) PCT Pub. No.: WO02/095727

PCT Pub. Date: Nov. 28, 2002

(65) Prior Publication Data

US 2008/0052516 A1 Feb. 28, 2008

(30) Foreign Application Priority Data

May 17, 2001 (JP) .............................. 2001-148439

(51) Int. Cl.
*G06K 9/00* (2006.01)
*H04L 9/00* (2006.01)

(52) U.S. Cl. ....................... 382/100; 382/128; 382/232; 382/280; 382/135; 713/176; 380/51; 380/54; 380/200; 380/28; 380/30; 380/252; 380/254

(58) Field of Classification Search ................... 705/75, 705/57, 58, 59; 704/258, 253, 260; 382/100, 382/128, 232; 380/51, 54, 200; 713/176; 725/19
See application file for complete search history.

(56) References Cited

U.S. PATENT DOCUMENTS 6,332,030 B1\* 12/2001 Manjunath et al. .......... 382/100

(Continued)

FOREIGN PATENT DOCUMENTS

JP 11306675 11/1999

(Continued)

OTHER PUBLICATIONS

Spatial synchronization using watermark key structure, SPIE 2004.\*
Interim Guidelines for Examination of Patent Applications for Patent Subject Matter Eligibility (http://www.uspto.gov/web/offices/pac/dapp/opla/preognotice/guidelines101_20051026.pdf).\*
S. Sakaguchi, et al., "The Effect of Polarity Inversion of Speech on Human Perception and Data Hiding as an Application", Proc. ICASSP, Jun. 2006, pp. 917-920.

*Primary Examiner*—Vikkram Bali
*Assistant Examiner*—Nancy Bitar
(74) *Attorney, Agent, or Firm*—Scully, Scott, Murphy & Presser, P.C.; Kenneth R. Corsello, Esq.

(57) ABSTRACT

A contents border detection apparatus and monitoring method. The apparatus comprises a digital watermark detector for detecting a digital watermark embedded in contents for which a time element is provided; and a border detector for detecting border locations for the contents corresponding to the state of the digital watermark detected by the digital watermark detector. The border detector includes a first border specification device for specifying the border locations for the contents based on information, written in the digital watermark, that is detected by the digital watermark detector and includes a second border specification device for specifying the border locations for the contents based on bit patterns embedded as the digital watermark. The border locations for the contents are detected by using the process result obtained both by the first and the second border specification devices.

14 Claims, 32 Drawing Sheets

U.S. PATENT DOCUMENTS

| | | | |
|---|---|---|---|
| 6,674,873 B1 * | 1/2004 | Donescu et al. | 382/100 |
| 6,711,276 B1 * | 3/2004 | Yoshiura et al. | 382/100 |
| 6,785,398 B1 * | 8/2004 | Shimizu et al. | 382/100 |
| 6,940,993 B2 * | 9/2005 | Jones et al. | 382/100 |
| 7,310,819 B2 * | 12/2007 | Maes et al. | 726/26 |
| 7,392,392 B2 * | 6/2008 | Levy | 713/176 |
| 7,454,621 B2 * | 11/2008 | Maes et al. | 713/176 |
| 7,460,667 B2 * | 12/2008 | Lee et al. | 380/205 |
| 2002/0120849 A1 * | 8/2002 | McKinley et al. | 713/176 |

FOREIGN PATENT DOCUMENTS

| | | | |
|---|---|---|---|
| JP | 2000172282 | | 6/2000 |
| JP | 2000-216981 | * | 8/2000 |
| JP | 2001067792 | | 3/2001 |
| JP | 200216981 | | 8/2001 |
| JP | EP1396839 | * | 5/2002 |
| JP | 2002-169579 | * | 6/2002 |

* cited by examiner

CONTENTS BORDER DETECTION APPARATUS, MONITORING METHOD, AND CONTENTS LOCATION DETECTION METHOD AND PROGRAM AND STORAGE MEDIUM THEREFOR

CROSS REFERENCE AND PRIORITY

This application filed under 35 USC 371, is cross-referenced with, and claims priority from, International Patent Application PCT/JP02/04671 filed on 14 May 2002, and published in English with Publication No. WO 02/095727 on 28 Nov. 2002, under PCT article 21(2), which in turn claims priority of 2001-148439, filed on 17 May 2001.

TECHNICAL FIELD

The present invention relates to a method for detecting the location of the border of the contents for a video, music, audio or a speech that is broadcast, so that the monitoring of a broadcast can be performed.

BACKGROUND

For the broadcasting distribution of video and music contents, in order to research a market and to charge a contents use fee, broadcasts are monitored, and the time and the duration of contents broadcasts are examined. In this type of broadcast monitoring, which uses a specific method, contents identification information is added to broadcast contents and is detected during the broadcasting process. Thereafter, for the contents, the broadcast time and the duration are specified.

Conventional methods for adding identification information to contents include, for example, a method whereby a signal for a special waveform is simply added at the beginning and the end of contents, and a method whereby predetermined information, transported by a sub-carrier, is added at the beginning and the end of contents. According to the second method for transporting information using a sub-carrier, the magnitude of the sub-carrier is changed in accordance with the envelopes of the sounds of the speech or music contents that are broadcast, so that, when successful, the relevant information can not be picked up by the ears of a person. In addition, for video contents, a method exists whereby predetermined coded information is added to the area of a single line that is not used for video recording.

A digital watermarking technique has become popular whereby special information is embedded so that it does not affect the quality of contents. Therefore, it has been proposed that identification information (hereinafter referred to as monitoring information) used for broadcast monitoring be embedded in contents for which a digital watermarking technique is used. In this case, a digital watermark in broadcast data is detected that identifies all the broadcast contents, and detected monitoring information is employed to specify the time predetermined contents were broadcast (the location, along a time axis, occupied by the broadcast data) as well as the time the broadcast monitoring was performed.

Compared with a method for adding information to a sub-carrier and a specific contents area, a method for adding the monitoring information to the contents by using the digital watermarking technique has the following merits. Since information can be embedded throughout the contents, information is seldom lost due to the processing or the deterioration of the contents.

Further, since monitoring information can be added to the contents, it is difficult for a third party to process the information, so that the security in place to prevent forgery and alteration of contents is high.

Problems to be Solved by the Invention

Generally, the object of the embedment of a digital watermark in contents is the prevention of forgery and the alteration of the contents. Therefore, one data set (digital watermark) is repetitively embedded in the contents. Thus, when a digital watermark is employed as monitoring information to detect the time and the duration of the broadcasting of contents, the border locations (the start and the end locations) of the contents currently being broadcast must be identified based on the digital watermark.

When the contents to be monitored are video contents, all the information (ID information) concerning the contents can be embedded in each unit frame. Therefore, the ID information in each frame can be detected, and the frame in which ID information that differs from a preceding frame is detected can be identified as a contents border.

However, for speech or music contents, it is not easy for the borders of the contents to be identified based on a single digital watermark, because unlike video contents there is no clear time delimiter, such as a frame, for the video contents. This is also because, since spaces, such as frames for video contents, are not present at time locations (specific locations along the time axis), not all ID information can be embedded in a single time location, and specific time widths are required for the contents in order to embed the ID information.

Specifically, in order to delineate contents borders of the ID information for a digital watermark that is embedded in speech or music contents, a process must be performed for a one-dimensional bit stream to differentiate between a portion of the stream that is detected in the contents of a data set extracted from that part of the stream that is detected in succeeding data set contents.

In addition, for broadcast contents, a digital watermark may be deteriorated by noise, resulting in the loss of high frequency sounds, and the editing process for broadcast and audio compression and the bits detected may include many errors. In order to correct erroneous determinations resulting from errors, it is necessary for a digital watermark having a specific length to be detected in an audio portion and for ID information to be identified. However, in accordance with this method, since speech or music in which it is anticipated a digital watermark will be detected has a specific time width, it is difficult to precisely specify locations at which contents containing an embedded digital watermark have been switched.

As is described above, when the border of broadcast speech or music contents is delineated by using a digital watermark that is embedded in the contents and that is to be used as monitoring information, it is difficult to obtain, relative to the location of the border of speech or music contents, results that are both satisfactorily reliable and precise.

It is, therefore, one object of the present invention to employ multiple methods for identifying contents borders based on a digital watermark detected in contents, so as to provide both high reliability and precision for the identification of contents border locations.

SUMMARY OF THE INVENTION

To achieve the above objects, according to the present invention, a contents border detection apparatus having the following configuration is provided. A contents border detection apparatus comprises: a digital watermark detector, for detecting a digital watermark embedded in contents for which a time element is provided; and a border detector, for detecting border locations for the contents corresponding to the state of the digital watermark detected by the digital watermark detector, wherein the border detector includes first border specification means, for specifying the border locations for the contents based on information, written in the digital watermark, that is detected by the digital watermark detector, and second border specification means, for specifying the border locations for the contents based on bit patterns embedded as the digital watermark, wherein the border locations for the contents are detected by using the process results obtained both by the first and the second border specification means.

Initially, the first border specification means specifies a reliable border location, even though it has a specific time width, and then, within a range specified by the first border specification means, the second border specification means more accurately specifies a border location. As a result, border locations can be detected both reliably and accurately.

The border detector includes: third border specification means, for specifying the location of the border of the contents based on the appearance pattern of a synchronization signal used for the detection of the digital watermark, wherein the location of the border of the contents is detected by using the process results obtained by both the first and the second border specification means and the process results obtained by the third border specification means.

Based on the contents border locations that are determined by the first and second border specification means, the border location is more specifically designated in accordance with a synchronization signal, so that the location of the border can more accurately be detected.

The contents border detection apparatus of the present invention can comprise: means that use a method for specifying the location of the border of contents based on the bit detection strength, instead of the above described method that uses the bit embedding pattern as the second border specification means.

Since the method using the detection strength is appropriate for designating a border location whereat the watermarked contents begin or end, instead of whereat the watermarked contents are switched, this method and the method involving the use of the bit embedding pattern can be employed, depending on the type of border provided for the contents.

Furthermore, according to the present invention a contents border detection apparatus having the following configuration can be provided. The contents border detection apparatus comprises: a digital watermark detector, for detecting a digital watermark embedded in contents including a time element; and a border detector, for detecting the location of the border of the contents in accordance with the state of the digital watermark detected by the digital watermark detector, wherein the border detector predicts the detection results for a predetermined bit based on a bit string segment, having a specific length, of a predetermined bit string that is embedded as a digital watermark in the contents, and depending on whether the actual detection results obtained for the predetermined bit match the prediction results, identifies the location of the border of the contents.

When an M sequence bit string is repetitively embedded as a digital watermark in the contents, the border detector employs a predetermined M sequence to predict the results obtained for a bit that is detected adjacent to the M sequence bit string, and employs the prediction results to specify the location of the border of the contents.

The method used by the contents border detection apparatus can be employed only when a special bit for the detection of the border location is embedded in the contents. When this condition is satisfied, this method and the several methods mentioned above can be used together to more reliably detect an accurate border location.

Further, according to the present invention, a monitoring method for specifying the time occupied by predetermined contents in broadcast data, including a variety of types of contents, comprises the steps of: detecting a digital watermark embedded in the contents of the broadcast data; employing the state of the digital watermark to detect the location of the border of the contents in the broadcast data; and employing the location of the border of the contents to designate the period of time that the contents occupy in the broadcast data, wherein the step of detecting the location of the border of the contents includes the steps of performing a first method, based on information written in the digital watermark, to identify the location of the border of the contents in which the digital watermark is embedded, employing a second method, based on information related to a bit embedded as a digital watermark, to specify the location of the border of the contents more accurately than is possible with the first method, based on the location of the border designated by the first method.

The step of specifying the location of the border of the contents using the second method includes the steps of: predicting detection results for a predetermined bit based on a bit string segment, having a specific length, of a predetermined bit string that is embedded as a digital watermark in the contents; and designating the location of the border of the contents based on whether the actual detection results for the predetermined bit match the predicted results.

In the monitoring method, the step of detecting the location of the border of the contents includes the step of: employing a third method, based on an appearance pattern for a synchronization signal used for the detection of the digital watermark, to designate the location of the border of the contents more accurately than is possible with the second method, based on the location of the border specified using the second method.

Furthermore, according to the present invention, a contents location detection method can be provided for detecting the location, along the time axis, of predetermined speech or music contents in speech or music data. The contents location detection method comprises the steps of: detecting a digital watermark embedded in the speech or music contents of the speech or music data; employing a first method based on information written in the digital watermark to specify the location of the border of the speech or music contents in which the digital watermark is embedded; and employing a second method, based on the detection strength of a bit embedded as the digital watermark, to specify the location of the border of the speech or music contents more accurately than by the first method, based on the location of the border designated using the first method.

Moreover, according to the present invention, a program can be provided that permits a computer to perform processes corresponding to the individual steps of the contents location detection method and the monitoring method. This program can be provided by being stored on a magnetic disk, an optical disk, a semiconductor memory or another storage medium, or by being read from a storage device and distributed, via a network, by a program transmission apparatus that is connected to the network.

DETAILED DESCRIPTION OF THE INVENTION

The preferred embodiment of the present invention will now be described in detail while referring to the accompanying drawings.

Figure 1:
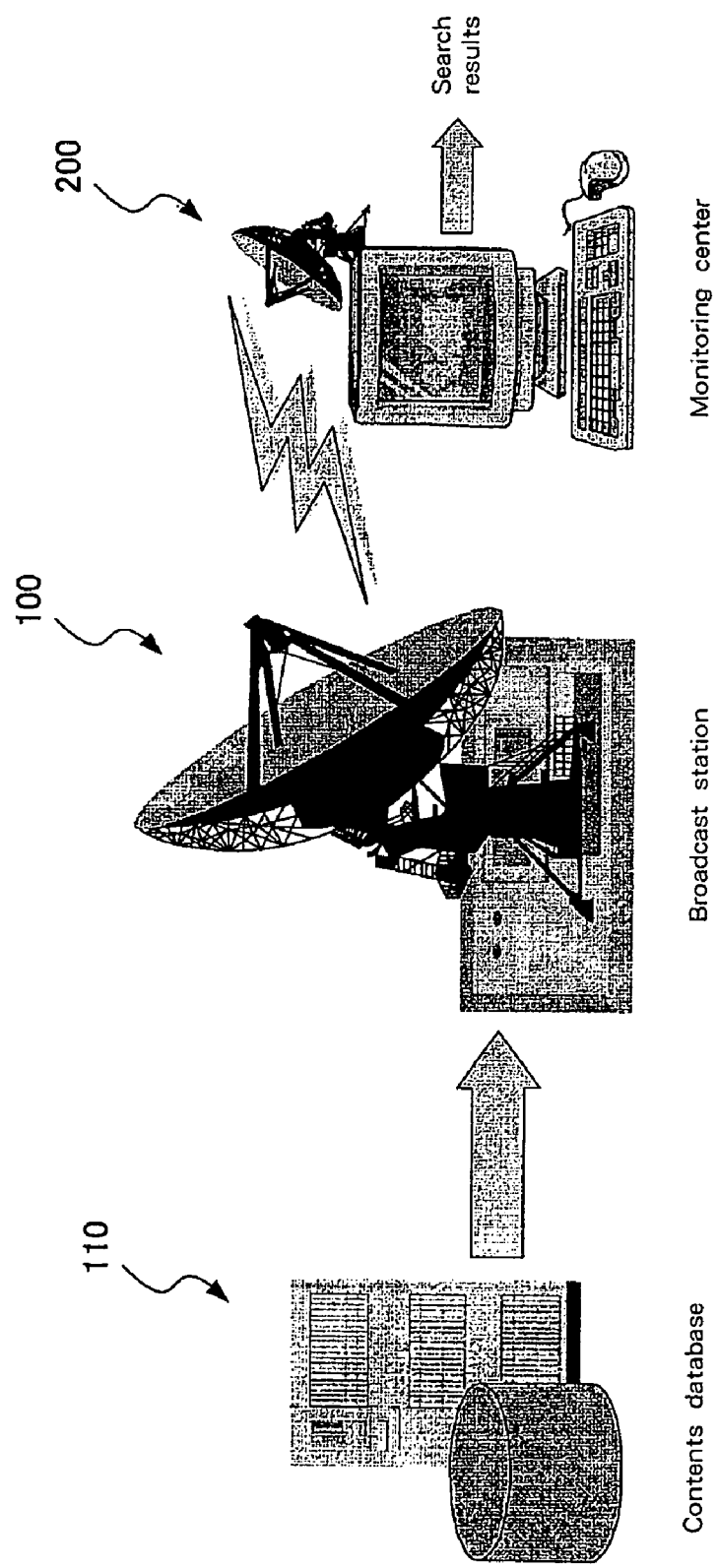
FIG. 1 is a schematic diagram for explaining the configuration of a broadcast monitoring system according to one embodiment of the present invention.

FIG. 1 is a schematic diagram for explaining a broadcast monitoring system according to the embodiment of the present invention. A method used in this embodiment to identify the border of contents can be used not only for speech or music contents, but also a portion of the contents wherein video, music, audio and speech are combined, and for video contents. In the following explanation, speech or music contents are employed.

As is shown in FIG. 1, the system according to the embodiment comprises: a broadcast station 100, for broadcasting speech or music contents, and a monitoring center 200, for receiving a broadcast and performing broadcast monitoring.

The broadcast station 100 obtains desired speech or music contents from a contents database 110, and broadcasts the contents as a program. The contents database 110 may be owned by the broadcast station 100, or a database belonging to an external organization may be employed. Information (ID information) concerning the speech or music contents is embedded in the speech or music contents using a digital watermarking technique. The ID information may be employed as monitoring information, and special information, specifically for broadcast monitoring, may also be embedded.

Furthermore, broadcast station 100—specific information can be embedded as a digital watermark by-the broadcast station 100. An arbitrary digital watermarking method for embedding ID information in speech or music contents can be employed so long as the following two conditions are satisfied:

(i) multiple bits can be embedded; and
(ii) multiple bits (i) are embedded by sequentially embedding different bits along the time axis.

It is also possible to employ an arbitrary broadcasting form, such as one that for broadcasting uses a ground or a satellite-relayed wave, a cable, or an information network, like the Internet.

When the monitoring center 200 receives a broadcast from the broadcast station 100, it examines the contents of the transmission to determine the time, the length and the contents of the speech or music that was aired. Thereafter, the examination results are used for market research and as references for collecting use fees for contents.

In addition, for the research the monitoring center 200 uses ID information that is embedded in the speech or music contents as a digital watermark. That is, the ID information in the speech or music data (including the speech or music contents and speech or music other than the speech or music contents) obtained when the broadcast was received is detected, and is employed to establish the presence/absence of the speech or music contents and to identify the borders of the contents. Based on the results that are thus obtained, the time at which the speech or music contents were broadcast and their duration are specified.

In this embodiment, the borders of contents are the delimiters for the speech or music contents that are identified in accordance with the state of the detected digital watermark. When one of the following changes occurs in a digital watermark, its location is determined to be a speech or music contents border.

(i) A change from a state wherein a specific digital watermark is embedded to a state wherein a digital watermark is not embedded.
(ii) A change from a state wherein a digital watermark is not embedded to a state wherein a specific digital watermark is embedded.
(iii) A change in the contents of the information embedded as a digital watermark.

Figure 2:
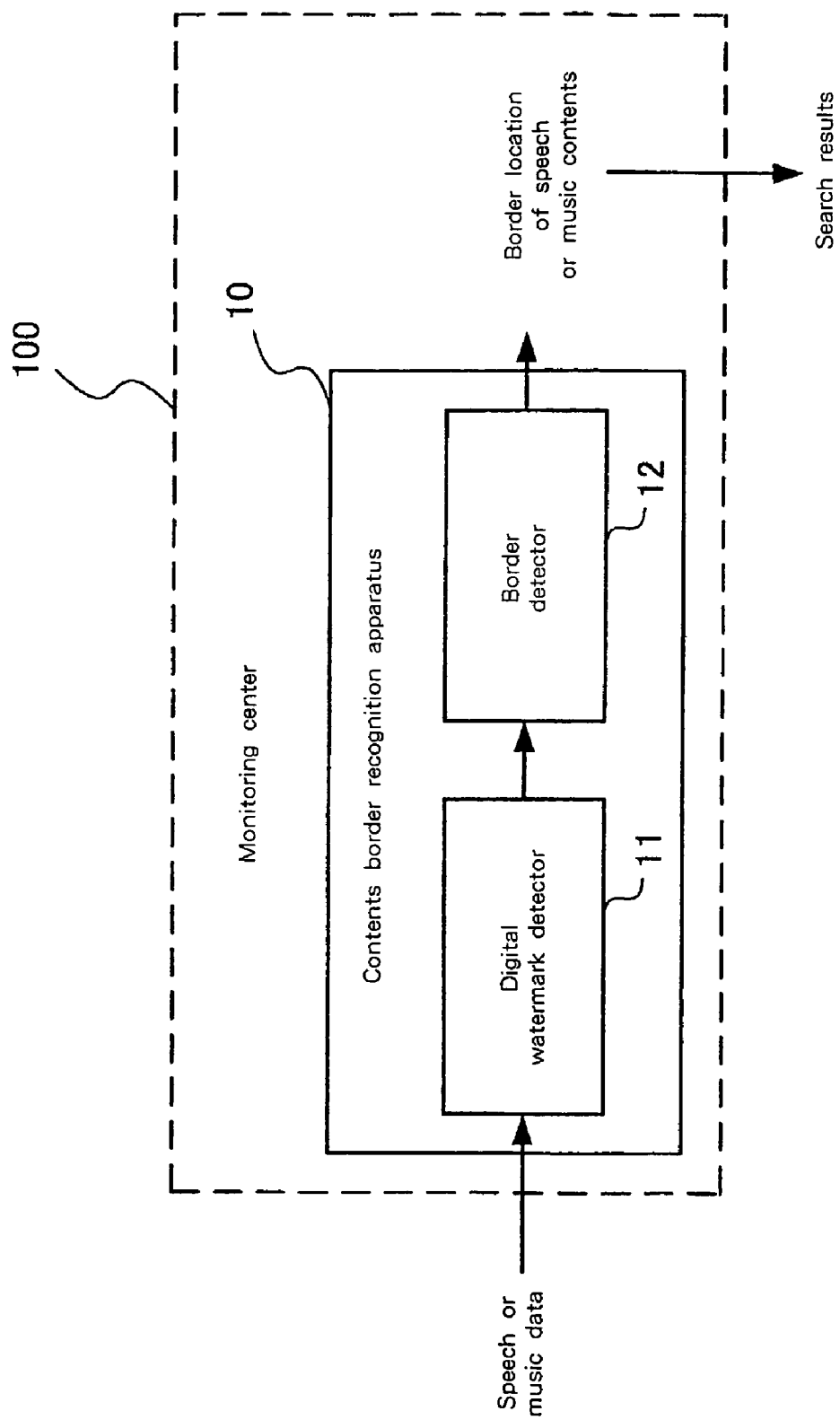
FIG. 2 is a diagram for explaining the configuration of a contents border recognition apparatus according to the embodiment.

FIG. 2 is a diagram for explaining the configuration of a contents border recognition apparatus, which is provided for the monitoring center 200, that detects a digital watermark embedded in received speech or music contents and employs the detection results to identify the borders of the speech or music contents.

As shown in FIG. 2, a contents border recognition apparatus 10 for this embodiment comprises: a digital watermark detector 11, for detecting a digital watermark embedded in speech or music contents; and a border detector 12, for detecting the borders of the speech or music contents based on the detection results obtained by the digital watermark detector 11.

The contents border recognition apparatus 10 is implemented as a personal computer, a workstation or another computer. The digital watermark detector 11 and the border detector 12 in FIG. 2 are blocks of software executed by a CPU under the control of a program. The program for controlling the CPU can be distributed by being stored on a storage medium, such as a magnetic disk or an optical disk, or by being transmitted over a network by a program transmission apparatus.

With this configuration, the digital watermark detector 11 detects a digital watermark in received speech or music data, and obtains the values of detected bits. At this time, synchronization of the positions is performed as needed. Further, errors are corrected in the values that are detected, and ID information for the speech or music contents in which the digital watermark is embedded is obtained by using the corrected values.

Then, based on the ID information constituting the digital watermark detected by the digital watermark detector 11, the border detector 12 designates locations for the borders of the speech or music contents in the received speech or music data, the time location whereat the ID information was detected, the detected values of the bits, and the synchronized positions.

A detailed explanation will be given for a method used by the border detector 12 for detecting the location of a border of speech or music contents.

In this embodiment, the location of a border of speech or music contents is designated by using a combination of multiple detection methods, so that both reliability and accuracy can be satisfied for the recognition of the location of a border of speech or music contents. Therefore, first, the individual detection methods that can be used for this embodiment will be described, and then, the processing employed for specifying the location of a border when these methods are used will be explained.

In this embodiment, the following five methods are employed to detect the location of a border of speech or music contents: (1) a method whereby results obtained when ID information is detected multiple times, while shifting the detection time zone, are used as a base for identifying the location of a border; (2) a method whereby the coherence of the ID information that is embedded in speech or music contents is used for identifying the location of a border; (3) a method whereby the detection strength of a digital watermark is used as a base for identifying the location of a border; (4) a method whereby the continuity of the synchronized position of ID information is used as a base for identifying the location of a border; and (5) a method whereby a special bit is used for identifying the location of a border.

In the following explanation, the reliability of the identification of the locations of the borders of the speech or music contents is defined while taking into consideration two error rates, an "erroneous adoption rate" and a "losing rate".

The "erroneous adoption rate": the probability that a portion that is not a border will be determined to be a border. When the erroneous adoption rate is high, borders are scattered here and there.

The "losing rate": the probability that a portion that is a border will be determined not to be a border. When the losing rate is high, borders are not set.

A tradeoff relationship is established between the erroneous adoption rate and the losing rate. That is, when a threshold value for the determination of a border is high, the erroneous adoption rate is reduced and the losing rate is increased. Whereas when the threshold is low, the erroneous adoption rate is increased and the losing rate is reduced.

Further, accuracy in the identification of the borders of speech or music contents means the degree to which errors are encountered when the locations of the borders are determined using a predetermined method. That is, according to a method whereby the location of a border is designated only within a range having a specific time width, an error occurs when a location is determined to lie within the range (the correct border location within the range is unknown), and the identification accuracy is reduced.

The individual detection methods will now be described.

(1) Detection method [1]: a method whereby results obtained when ID information is detected multiple times, while shifting the detection time zone, are used as a base for identifying the location of a border Since a digital watermark having a specific time length is embedded in speech or music contents, a digital watermark can be detected within a range having a specific time length. According to the detection method [1], the detection of a digital watermark is repeated while detection ranges having a specific time length are shifted so that they overlap. Then, the ID information for digital watermarks that are detected in the respective detection ranges is compared, and a location whereat the ID information changes is determined. In order, during the detection of a digital watermark, not to overlook and fail to read ID information that is repetitively embedded in speech or music contents, individual detection ranges must be overlapped a distance that is, at the least, equivalent to one digital watermark cycle.

Figure 3:
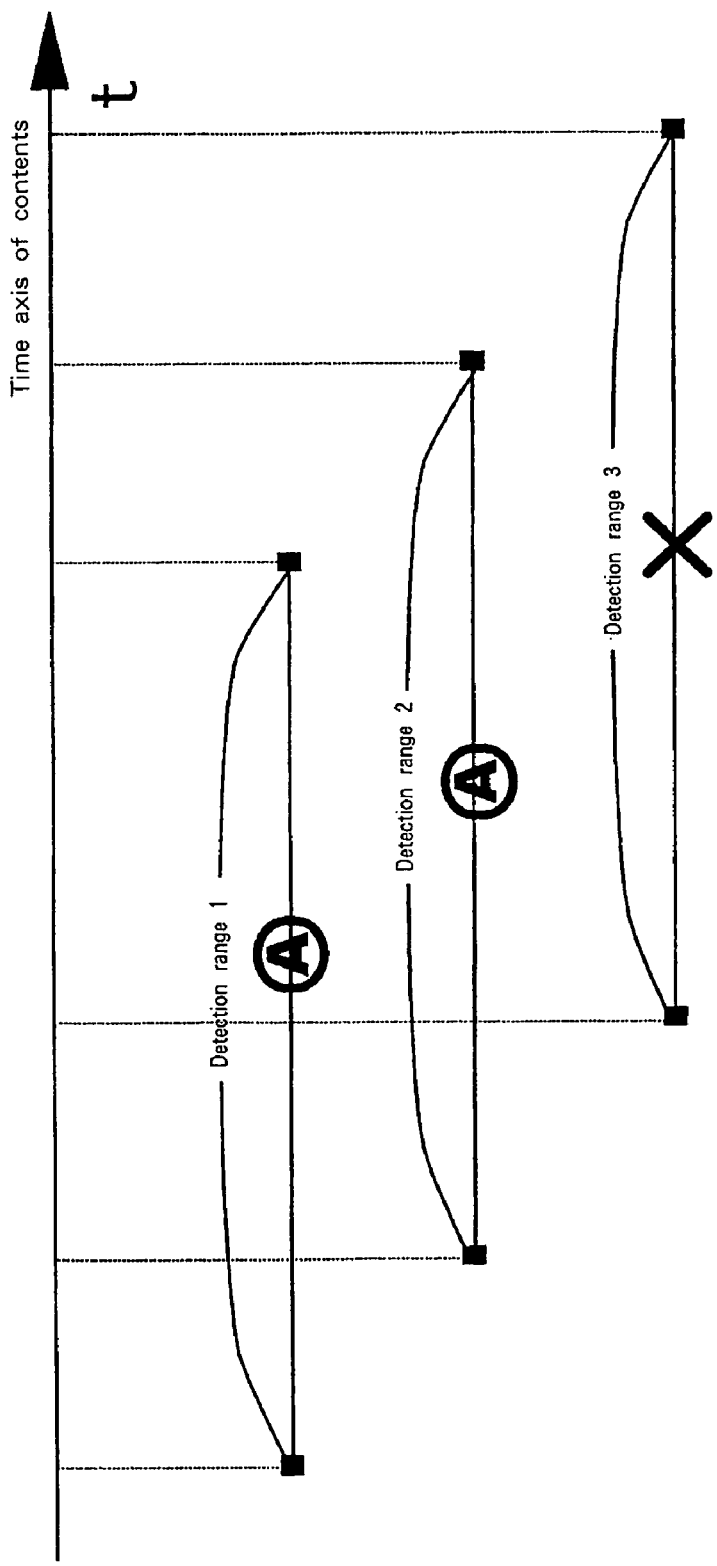
FIG. 3 is a diagram showing the state wherein a digital watermark is repetitively detected, using detection method [1] of the embodiment, while the detection range is changed.

FIG. 3 is a diagram showing the state wherein the detection of a digital watermark is repeated while the detection range is shifted.

In FIG. 3, a digital watermark is detected sequentially in detection range 1, detection range 2 and detection range 3. In detection ranges 1 and 2, the digital watermark for ID information "A" is detected, whereas in detection range 3, no digital watermark is detected (indicated by an x in FIG. 3).

Figure 4:
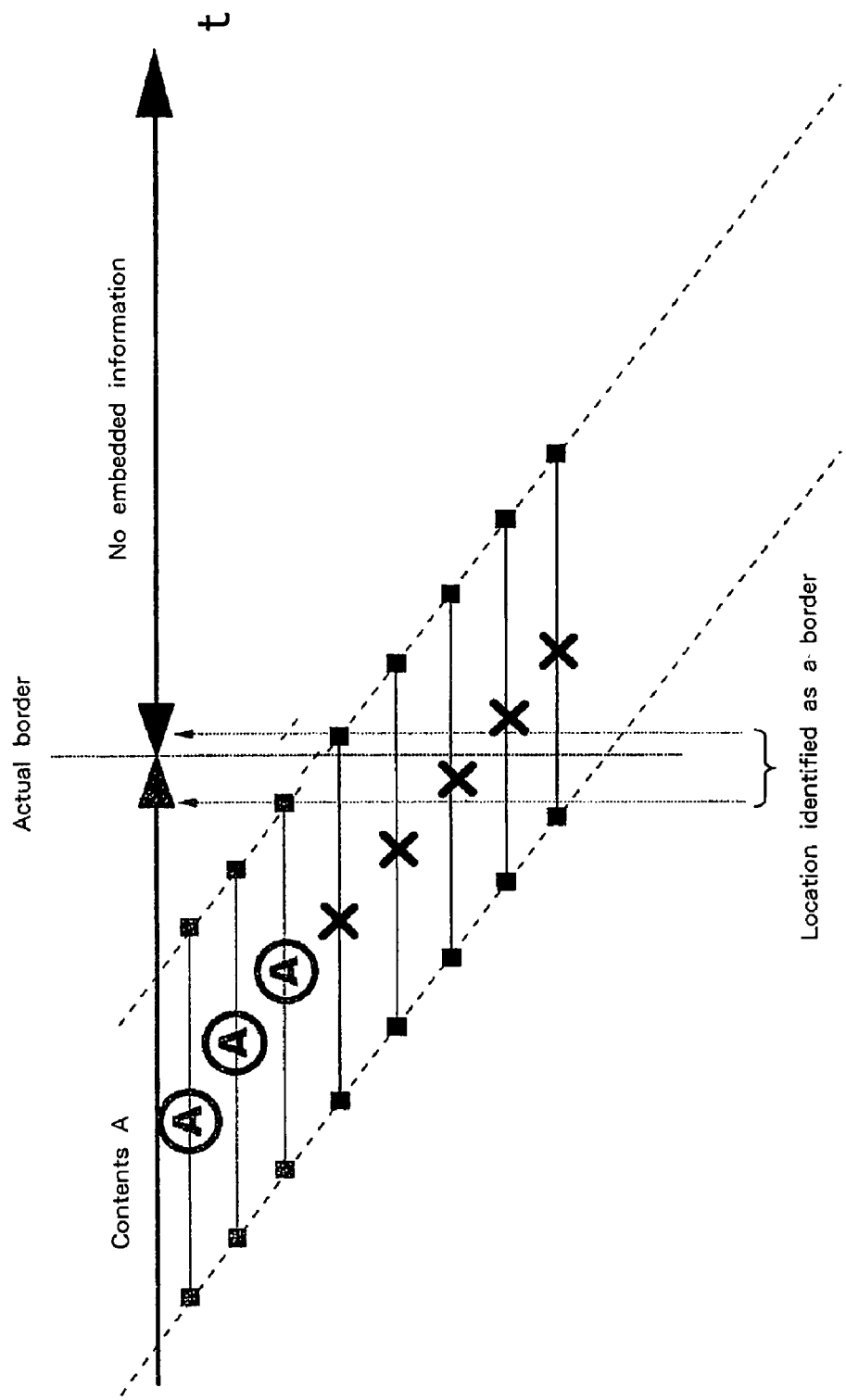
FIG. 4 is a diagram for explaining the location of the border detected using detection method [1] of the embodiment when a state wherein a digital watermark is present is changed to a state wherein no digital watermark is present.
Figure 5:
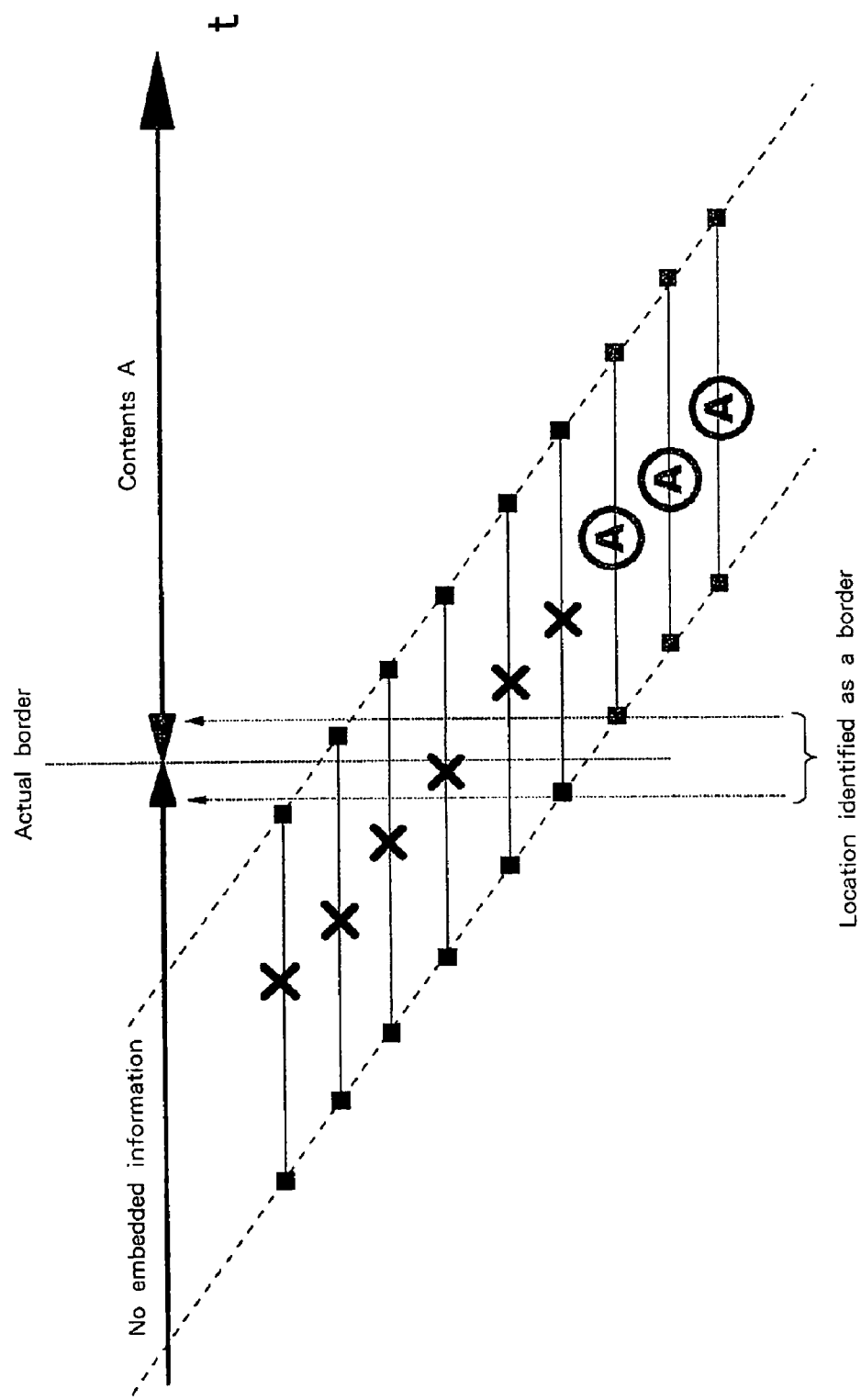
FIG. 5 is a diagram for explaining the location of the border detected using detection method [1] of the embodiment when a state wherein no digital watermark is present is changed to a state wherein a digital watermark is present.
Figure 6:
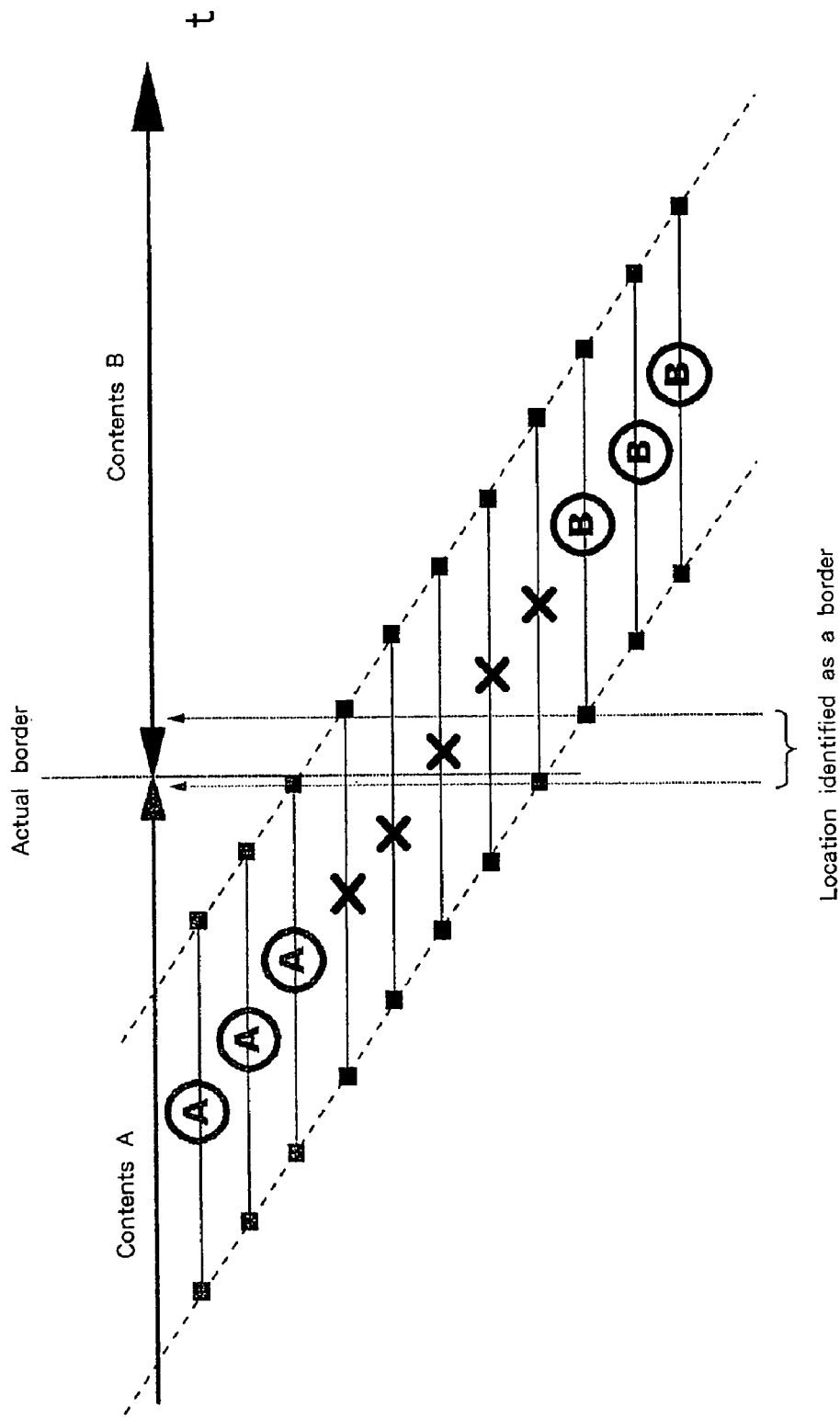
FIG. 6 is a diagram for explaining the location of the border detected by the detection method [1] of the embodiment when a state wherein ID information employed as a digital watermark is changed.

FIGS. 4 to 6 are diagrams showing the states wherein the locations of three borders of speech or music contents are identified using the detection method [1]. In FIG. 4 is shown a change wherein states in which a digital watermark is present are followed by states in which no digital watermark is present. In FIG. 5 is shown a change wherein states in which no digital watermark is present are followed by states in which a digital watermark is present. And in FIG. 6 are shown states wherein a change occurs in the ID information in a digital watermark.

In FIG. 4, the detection ranges indicated by A are those in which a digital watermark for ID information "A" is detected, and the detection ranges indicated by x are those in which a digital watermark is not detected. It should be noted that the ID information "A" is defined as ID information embedded in speech or music contents A.

As is shown in FIG. 4, when the detection result for the speech or music contents changes from a state wherein a digital watermark is present to a state wherein no digital watermark is present, it is ascertained that the speech or music contents A, in which the ID information "A" is embedded, continue up to the last detection range wherein the digital watermark for the ID information "A" is detected. Therefore, it is determined that the location of the border whereat the speech or music contents A end is located between the end position of the last detection range wherein the digital watermark for the ID information "A" is detected and the end position of the first detection range wherein the digital watermark is not detected, i.e., somewhere within the shift width at the ends of the two detection ranges. It should be noted, however, that the location of the border within this range can not accurately be specified.

In FIG. 5, as in FIG. 4, the detection ranges indicated by A are those in which the digital watermark for ID information "A" is detected, and the detection ranges indicated by x are those in which the digital watermark is not detected. It should be noted that the ID information "A" is ID information embedded in the speech or music contents A.

As is shown in FIG. 5, when the detection result for the speech or music contents changes from the state wherein no digital watermark is present to the state where the digital watermark is present, the speech or music contents A, in which the ID information "A" is embedded, are already present in the first detection range in which the digital watermark for the ID information "A" is detected. Therefore, it is found that the location of the border whereat the speech or music contents A begin is located between the start position of the first detection range wherein the digital watermark for the ID information "A" is detected and the start position of the last detection range wherein the digital watermark for the ID information "A" is not detected, i.e., somewhere within the shift width at the start ends of the two detection ranges. It should be noted, however, that the location of the border within this range can not accurately be specified.

In FIG. 6, the detection ranges indicated by A are those in which the digital watermark for the ID information "A" is detected, the detection ranges indicated by B are those in which the digital watermark for ID information "B" is detected, and the detection ranges indicated by x are those in which no digital watermark for specific ID information is detected. It should be noted that the ID information "A" is defined as ID information embedded in the speech or music contents A and the ID information "B" is defined as ID information embedded in the speech or music contents B.

As is shown in FIG. 6, when the ID information is changed as the detection results for speech or music contents, neither ID information can be detected in the detection range extending from the speech or music contents A to the speech or music contents B (also in this detection range, evidence that specific information is embedded as a digital watermark can be obtained in accordance with the detection strength). However, as in FIGS. 4 and 5, the speech or music contents A wherein the ID information "A" is embedded are actually present up to the last detection range wherein the digital watermark for the ID information "A" is detected, and the speech or music contents B wherein the ID information "B" is embedded are actually present beginning at the first detection range wherein the digital watermark for the ID information "B" is detected. Therefore, the border location whereat the speech or music contents A change to the speech or music contents B is located between the end position of the last detection range wherein the digital watermark of the ID information "A" is detected and the start position of the first detection range wherein the digital watermark for the ID information "B" is detected. It should be noted, however, that the location of the border within this range can not accurately be specified.

Through this processing, the locations of all three of the borders can be detected using the detection method [1].

The ID information repetitively embedded as a digital watermark in speech or music contents can always be detected in one of the detection ranges using this method, so long as the ID information has not been lost due to deterioration. Further, when there is only slight deterioration of the ID information, the ID information can be corrected using a normal error correction technique provided by the digital watermark detector 11. Therefore, the reliability of the location of a border for speech or music contents identified using this method is very high.

The location of the border of the speech or music contents specified using this method is identified while constantly maintaining a specific time width. It can assume that the end point or the start point of a detection range or the middle point in a range identified as the location of the border is the actual border of the speech or music contents; however, in this case, an error occurs naturally. Therefore, the accuracy with which the border of the speech or music contents is identified is low.

When the correct ID information can not be obtained across the border of the speech or music contents, a digital watermark detector 11 having a high error correction capability may compensate for the ID information by applying the error correction technique, and may thereby determine that the digital watermark can be detected. In this case, the accuracy of the method used for the identification of the border of the speech or music contents is further reduced. In addition, when the width of the shift of the detection range is increased in order to avoid a barrier caused by error correction, as is shown in FIGS. 4 and 5 the border of the speech or music contents can be identified only by the unit of a range. As a result, the identification accuracy is further reduced.

A further detailed explanation will be given for the reliability and the precision of the identification of the border of speech or music contents according to the detection method [1].

Assume that N denotes the number of bits included in the ID information of the digital watermark, $\mu$ denotes the average of the detection strengths of the individual bits in the digital watermark, and 1 is the dispersion of the detection strengths. Then, the expected error rate $P_b$ is represented by equation 1.

$$P_b(\mu) = \int_{-\infty}^{0} \frac{1}{\sqrt{2\pi}} \exp\left(-\frac{(x-\mu)^2}{2}\right) dx \quad \text{[Equation 1]}$$

At this time, the probability $P_{a1}$ that the bit errors in N bits will be k is obtained using equation 2.

$$P_{a1}(\mu, N, x) = \binom{k}{N}(P_b(\mu))^k (1 - P_b(\mu))^{N-k} \quad \text{[Equation 2]}$$

When the number of bit errors does not exceed the upper limit ($N_c$) for error correction, the bit errors are corrected and the corrected ID information is output. The probability $P_{a2}$ is then obtained using equation 3.

$$P_{a2}(\mu, N, N_c) = \sum_{k=0}^{N_c} P_{a1}(\mu, N, x) \quad \text{[Equation 3]}$$

When the number of bit errors exceeds the upper limit ($N_c$) for error correction, the probability $P_{a3}$ that the detection of the ID information will fail is obtained using equation 4.

$$P_{a3}(\mu, N, N_c) = 1 - P_{a2}(\mu, N, N_c) \quad \text{[Equation 4]}$$

Figure 7:
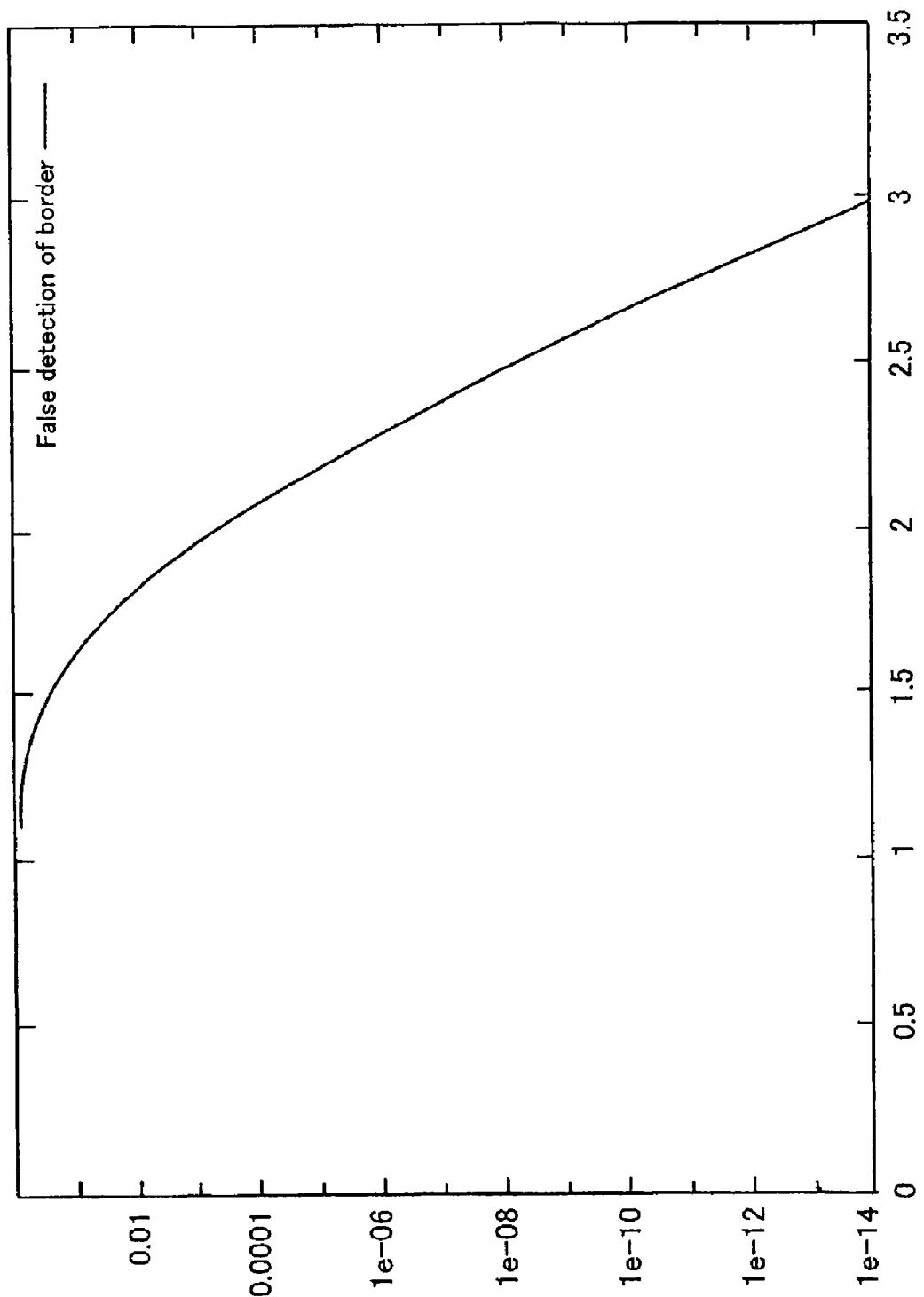
FIG. 7 is a graph showing the probability whereat, using detection method [1], the number of bit errors exceeds the upper limit ($N_c$) for error correction, and the detection of ID information fails.

FIG. 7 is a graph obtained by plotting the error adoption rate $P_{a3}$ for $\mu$ when $N_c=9$ and $N=128$.

When the detection of the ID information fails between periods wherein the correct ID information is detected, the border is erroneously determined at a location whereat the border of the speech or music contents was not originally present. Therefore, this probability represents an erroneous adoption rate.

Next, assume that the detection range extends across the border of the speech or music contents, and that the last M bits in the detection range are beyond the border and represent other information. Since this information is unknown, assume that the probability whereat the same bit will be embedded at a specific location is ½, i.e., equal to the probability whereat a different bit will be embedded at the specific location. Then, the probability whereat, of the M bits lying outside the border, m bits accidently match bits at the same locations in the ID information before the border is obtained using equation 5.

$$P_{a4}(M, m) = \binom{m}{M}\left(\frac{1}{2}\right)^M \quad \text{[Equation 5]}$$

When (M−m) bits, which do not match the ID information, are embedded to obtain a greater detection strength, the (M−m) bits more frequently cause an error correction or error detection failure. The probability that one bit that does not match the ID information is the cause of an error detection failure is $(1-P_b)$, because it can cause an error detection failure when no bit error occurs. Therefore, the following method can be employed to obtain the probability whereat the number of bits that is the cause of an error correction or error detection failure is k, under a condition wherein only M bits are located beyond the border. The following three types of bits contribute to error detection failures.

1. Of M bits beyond the border, m bits are matched accidently. Some matching bits are inverted due to deterioration, and this causes an error detection failure. Suppose that the number of such bits is n. The limit for the number of such bits is $0 \leq n \leq m \leq M \leq N$. The probability whereat n bits out of m bits that match the ID information will be inverted is $P_{a1}(\mu, m, n)$.

2. Of M bits beyond the border, (M−m) bits that do not match the ID information cause an error detection failure only if these bits are detected. While some such bits are inverted due to deterioration and do not cause an error detection failure, the number of bits that are not inverted and that do cause an error detection failure is supposed to be P. The limit for the number of such bits is $0 \leq p \leq M-m \leq M \leq N$. And the probability whereat, of the (M−m) bits that do not match the ID information, p bits will not be inverted is $P_{a1}(\mu, M-m, M-m-p)$, because this probability equals the probability whereat (M−m−p) bits will be inverted.

3. N−M bits before the border are coherent and originally are not the cause of an error detection failure. However, some of these bits may be deteriorated and inverted and cause an error detection failure. Assume that the number of bits that causes an error detection failure is q. The limit for this number of such bits is 0≦q≦N−M≦N. Therefore, the probability whereat q bits out of N−M bits will be inverted is $P_{a1}$ (μ, N−M, q).

Since the total number of bits that cause an error detection failure is k, k=n+p+q is established.

Through this process, the probability $P_{a5}$, whereat k is the number bits that causes an error detection failure under a condition wherein only M bits are located beyond the border, is obtained using equation 6.

$$P_{a5}(N, M, k) = \sum_{m=0}^{M} \left( P_{a4}(M, m) \sum_{n+p+q=k} P_{a1}(\mu, m, n) P_{a1}(\mu, M-m, M-m-p) P_{a1}(\mu, N-M, q) \right)$$ [Equation 6]

With this equation, the probability $P_{a6}$ whereat error correction is enabled, even under a condition wherein only M bits are located beyond the border, is obtained using equation 7.

$$P_{a6}(N, M, N_c) = \sum_{k=0}^{N_c} P_{a5}(N, M, k)$$ [Equation 7]

Figure 8:
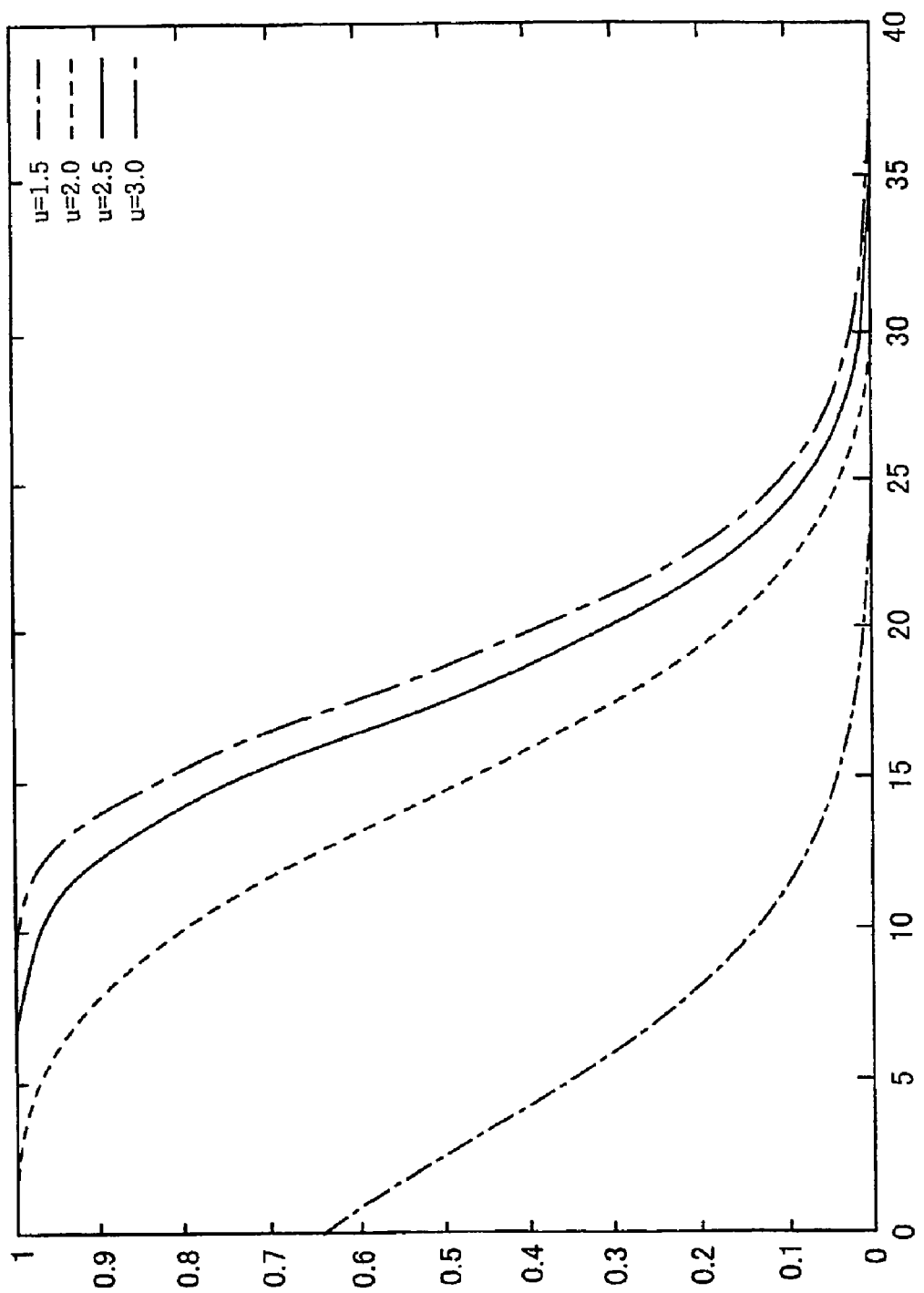
FIG. 8 is a graph showing the probability whereat, using detection method [1], errors can be corrected even in a condition wherein the detection range is extended across a border.

FIG. 8 is a graph obtained by plotting the probability $P_{a6}$ whereat error correction is enabled relative to the number of bits that are located beyond the border when $N_c$=9.

As the number M is increased, all the N bits that represent the ID information are finally constituted by the ID information of the next speech or music contents. In this case, since the ID information that is to be detected is changed, overlooking the border will never occur.

The most desirable states for the identification of the border of the speech or music contents using a digital watermark are:

(a) when the detection range is not extended across the border, error correction is always successful and the correct ID information is obtained; and (b) when the detection range is extended across the border, an error is always detected and the ID information can not be obtained. In order to establish the state (a), a higher error correction capability is desirable, but since this capability is limited, establishment of the state (a) can not be fully carried out. On the contrary, the error correction capability is a barrier to the establishment of the state (b). This is because, since the correction of an error is performed when the detection range extends only slightly across a border, it is ascertained that ID information is present even though the range exceeds the border.

Therefore, as is described above, there is little expectation that the detection method [1] can be used to highly accurately identify the location of a border of speech or music contents, and it is preferable that this method [1] be used only to roughly identify the location of a border.

(2) Detection method [2]: a method whereby the coherence of the ID information that is embedded in speech or music contents is used for identifying the location of a border Generally, the same ID information (bit string) is repetitively embedded in speech or music contents as a digital watermark. According to the detection method [2], bits at a distance equivalent to one cycle are compared based on the embedding pattern used for the bit string, and the continuity (coherence) of the ID information is examined to determine when and where the ID information changes.

Figure 9:
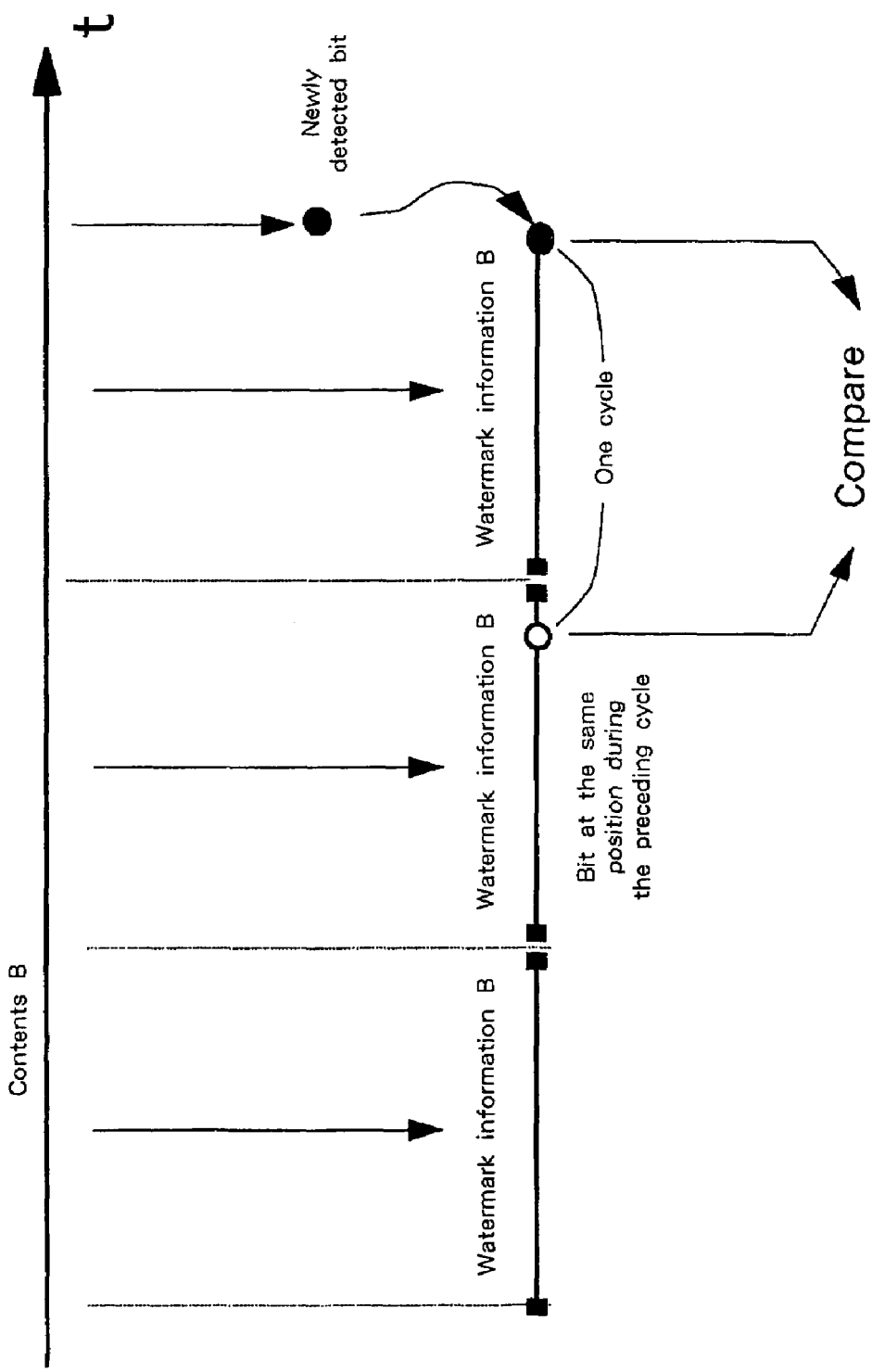
FIG. 9 is a diagram showing the cycles of bits detected by detection method [2] based on ID information that is embedded as a digital watermark in speech or music contents.

FIG. 9 is a diagram showing the cycles for detected bits using the ID information that is embedded in speech or music contents as a digital watermark.

In FIG. 9, the digital watermark for the ID information "B" is repetitively detected in speech or music data. Since the contents of the ID information "B" do not change, the same bit string is. cyclically detected (each ID information set constitutes a cycle).

As is shown in FIG. 9, when the same ID information is repetitively embedded-in speech or music contents, the same bit string is cyclically detected. Therefore, when the speech or music contents are continued and the ID information does not change, a currently detected bit is the same as a bit detected at the same location in the preceding ID information "B" bit string. That is, a currently detected bit corresponds to a bit detected during the preceding cycle. Therefore, if the currently detected bit differs from the bit detected during the preceding cycle, it is assumed that the ID information embedded as a digital watermark in the speech or music contents has been changed, and that the currently detected bit marks the border of the speech or music contents.

However, in actuality, the probability can not be ignored that the detected bit has been changed due to the deterioration of the digital watermark, even though the speech or music contents continue. Therefore, for the determination of a change in the ID information, a threshold value is set for a bit detection strength, and whether bits do or do not match is determined by using bits for which the detection strength exceeds the threshold value.

However, through this processing, when the speech or music contents end and a digital watermark is no longer present in the speech or music data, the detection strength of the digital watermark is uniformly reduced, and a state wherein no bits are detected occurs. Thus, the bits that match and do not match can not be identified and it can not be determined whether there is a change in the ID information. Therefore, the detection method [2] is not appropriate for the detection of a border (the borders described in (i) and (ii) above) when the speech or music contents end or start and can appropriately detect a border (the border described in (iii)) when the speech or music contents are switched and the ID information for the digital watermark is changed.

Even when the speech or music contents are switched and the ID information for the digital watermark is changed, some bits may accidently match. In this case, using the detection method [2] a border location whereat the speech or music contents are switched can not be specified correctly. That is, a location, which is advanced several bits from the actual border, where a bit appears that differs from the bit read thereat during the preceding cycle is determined to be the border, and accordingly, the accuracy is reduced.

A further detailed explanation will now be given for the reliability and accuracy attained when the border of speech or music contents is identified in accordance with the detection method [2].

The probability $P_{b1}$ whereat, since the deterioration of either a bit during the current cycle or a bit during the preceding cycle has occurred, it will be erroneously determined that these bits do not match, even though the location is not a border of the speech or music contents, is obtained using equation 8.

$$P_{b1}(0) = 2P_b(\mu)(1 - P_{b1}(\mu))$$ [Equation 8]

Especially when a determination as to whether bits match or do not match is not performed when detection strengths fall below a set threshold value, the probability $P_{b1}$ whereat matching or non-matching will be erroneously detected is obtained using equation 9.

$$P_{b1}(T_B) = 2P_b(\mu + T_B)(1 - P_{b1}(\mu + T_B))$$ [Equation 9]

Figure 10:
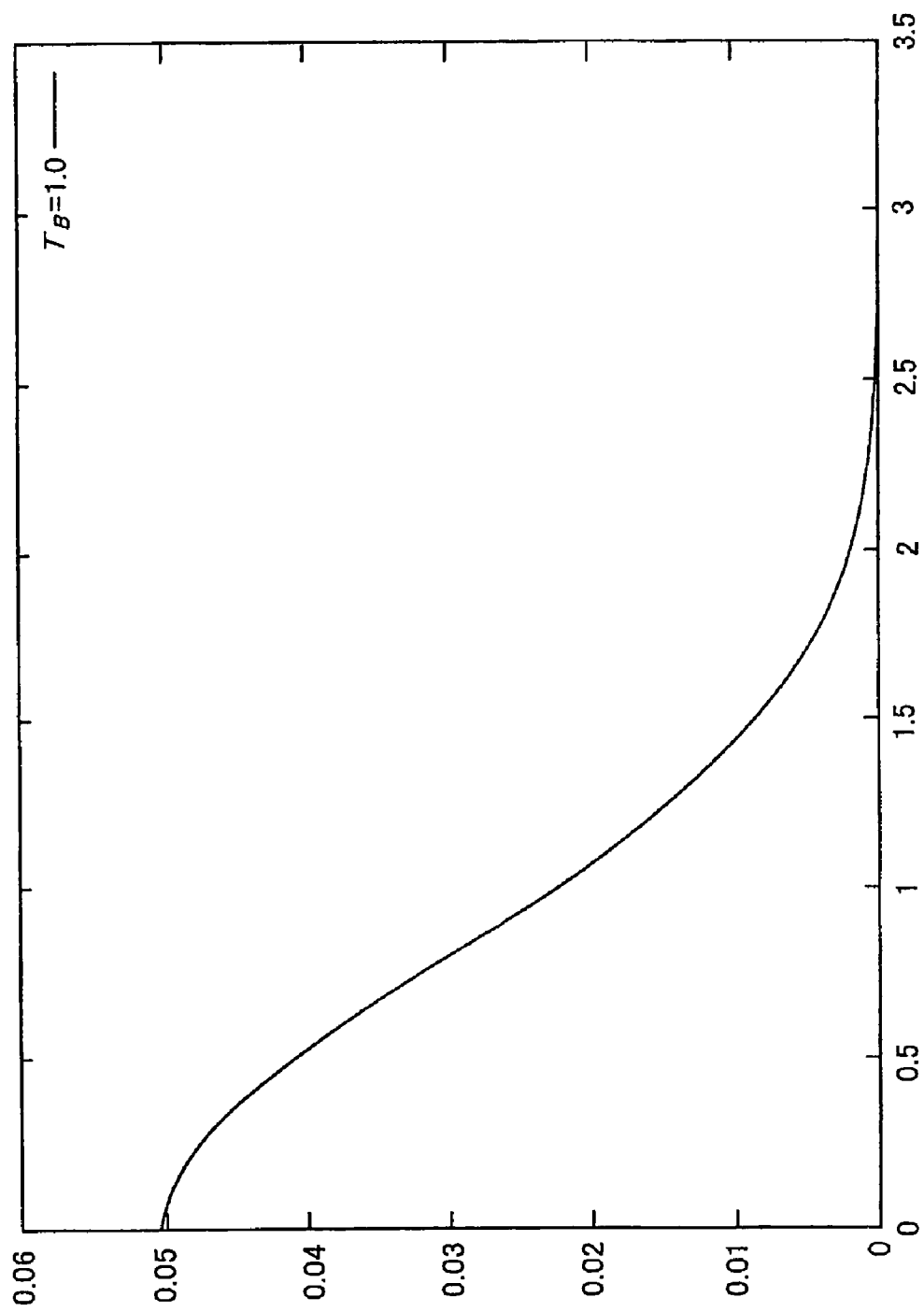
FIG. 10 is a graph showing the probability whereat, using detection method [2], the non-matching of bits will be erroneously detected, even though the bits do not define the border of the speech or music contents.

FIG. 10 is a graph obtained by plotting the probability $P_{b1}$ whereat the non-matching of bits is erroneously detected relative to the change in $\mu$ when $T_B = 1.0$ in equation 9.

The probability $P_{b2}$ whereat the non-matching of bits is erroneously detected at one portion, at the least, in N bits is obtained using equation 10.

$$P_{b2}(T_B, N) = 1 - P_b(T_B)^N$$ [Equation 10]

Figure 11:
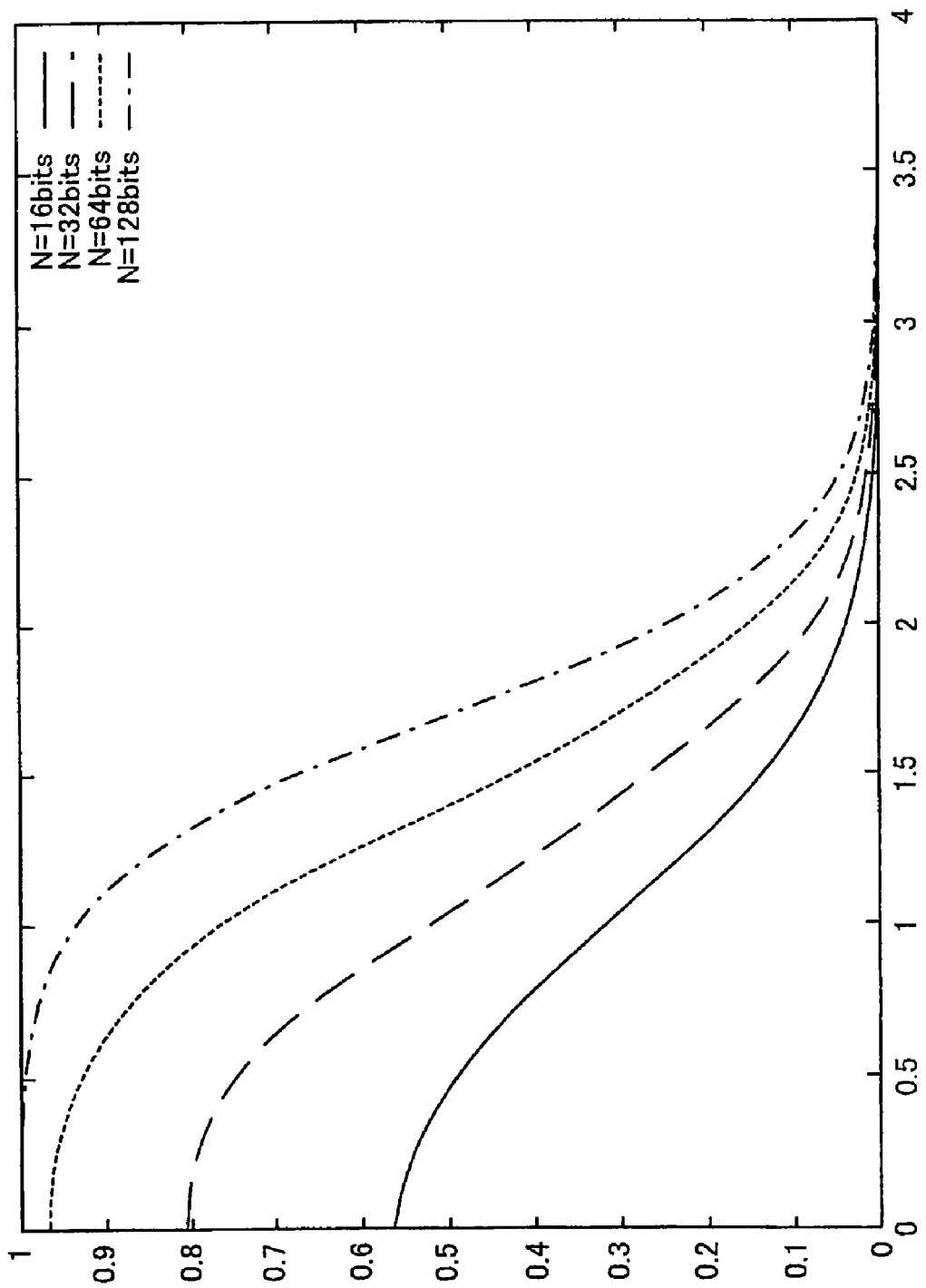
FIG. 11 is a graph showing the probability whereat, using detection method [2], non-matching is erroneously detected at one portion, at the least, in a predetermined N number of bits.

FIG. 11 is a graph obtained by plotting the probability $P_{b2}$ whereat the non-matching of bits is erroneously detected at one portion, at the least, in N bits relative to the change in $\mu$ when TB=1.0 in equation 10.

While taking these probabilities into account, for long ID information, the probability that non-matching will be detected can not be ignored.

The probability $P_{b3}$ whereat bits located outside the border of the speech or music contents will be detected as non-matching is obtained using equation 11.

$$P_{b3}(T_B) = \frac{1}{2}((1 - P_b(\mu - T_B))^2 + P_b(\mu - T_B)^2) + \frac{1}{2}P_{b1}(T_B)$$ [Equation 11]

In equation 11, the first term represents a case wherein an originally embedded bit differs from a corresponding bit during the preceding cycle and the bits, both during the current cycle and the preceding cycle, are detected without any bit errors, and a case wherein a bit error occurs in both current and preceding cycles. The second term represents a case wherein the originally embedded bit matches a corresponding bit during the preceding cycle, but these bits are detected as non-matching because either the bit during the current cycle or the preceding cycle is deteriorated.

The probability $P_{b4}$, whereat the non-matching of bits is not detected unless the border is exceeded a distance of M bits, is calculated as follows. Since this is the probability whereat a non-match with a corresponding bit during the preceding cycle is not detected for M-1 bits, and is detected at the M-th bit, this probability $P_{b4}$ is obtained using equation 12.

$$P_{b4}(M) = (1 - P_{b3}(T_B))^{(M-1)} P_{b3}(T_B)$$ [Equation 12]

Figure 12:
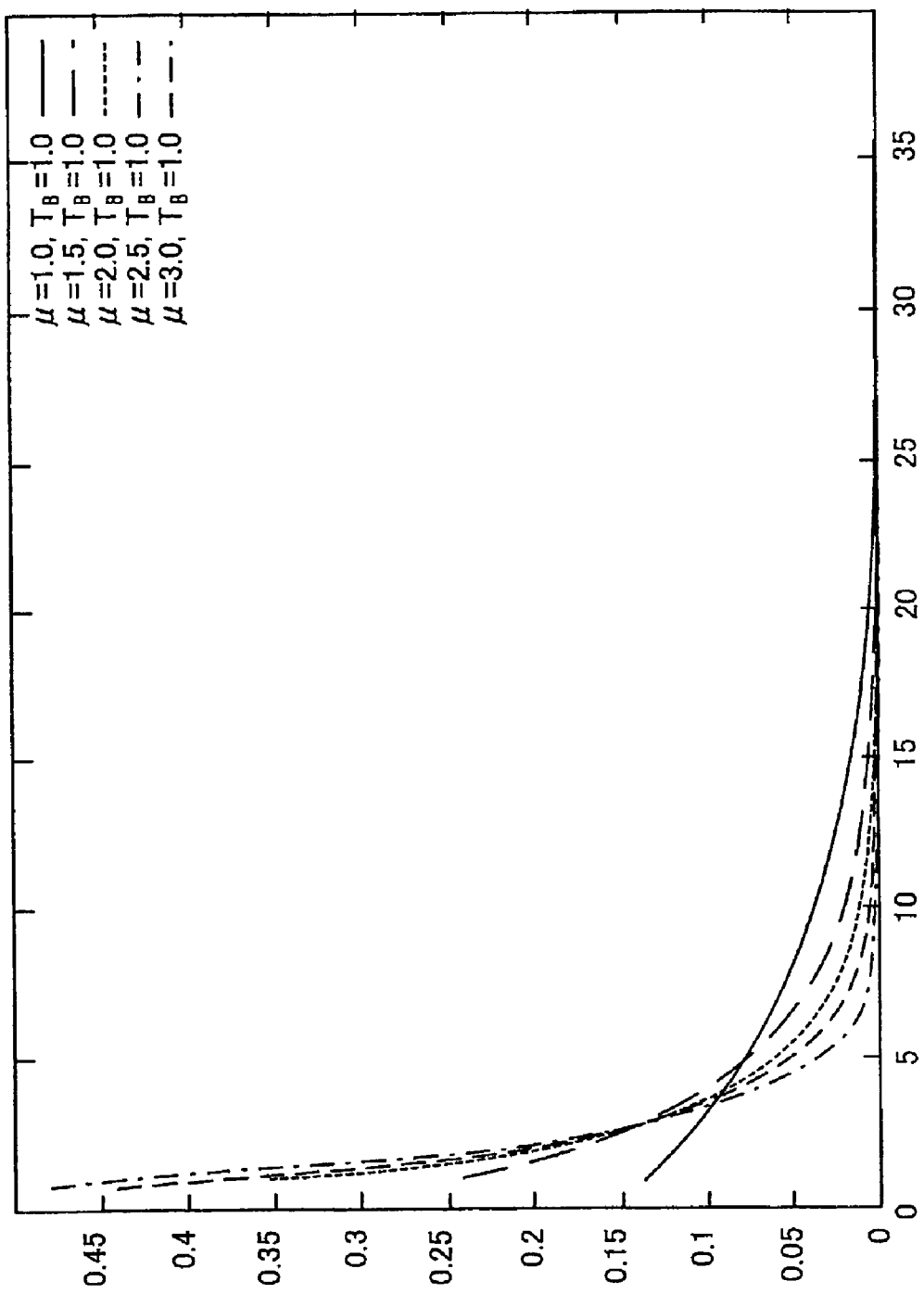
FIG. 12 is a graph showing the probability whereat, using detection method [2], non-matching can be first detected at a location M bits beyond the border.
Figure 13:
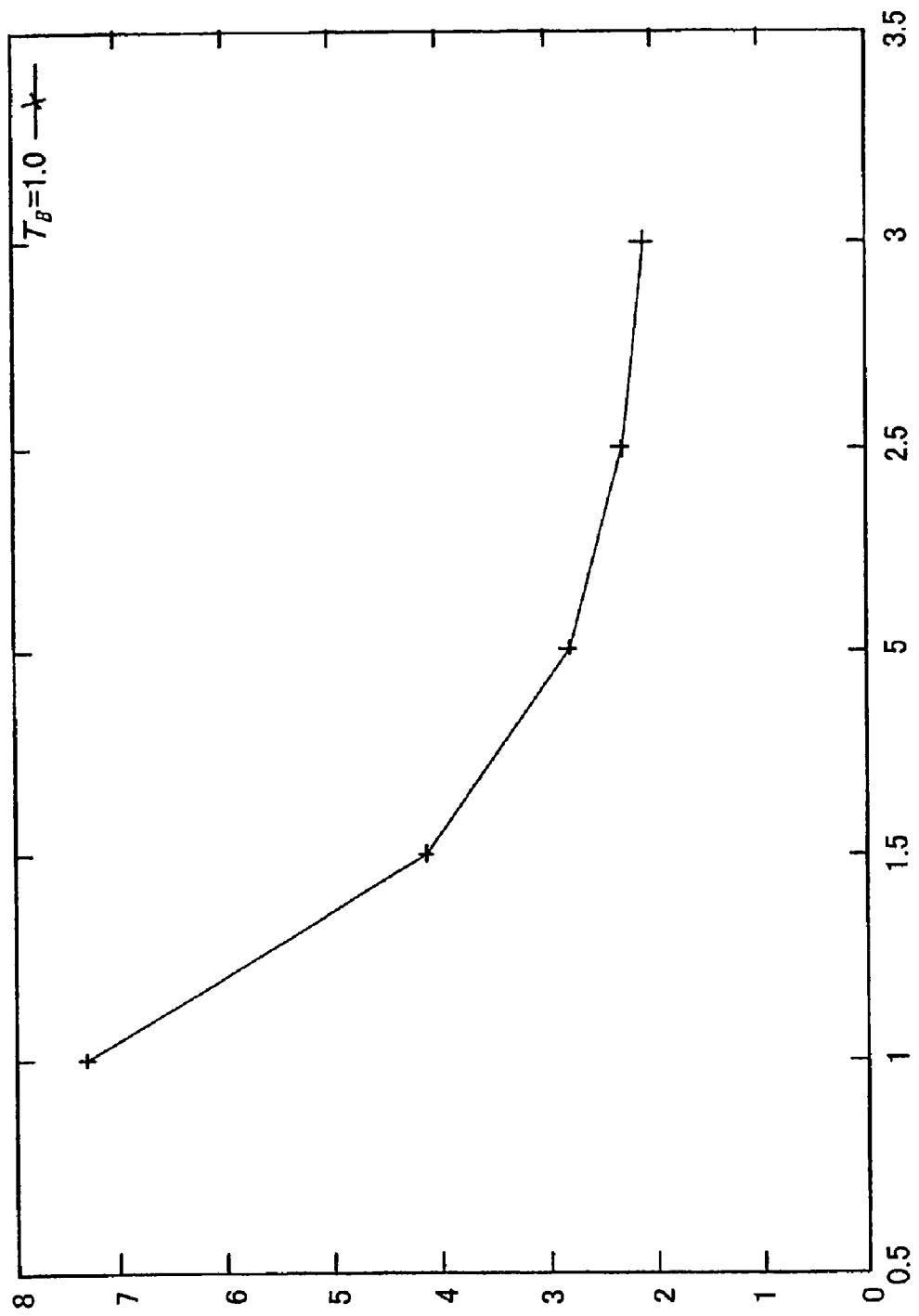
FIG. 13 is a graph showing the expected value for the location of a bit located beyond the border for which non-matching is first detected.

FIG. 12 is a graph obtained, when $T_B = 1.0$, by plotting the probability $P_{b4}$ whereat the non-matching of bits is first detected at the location of the last bit of those beyond the border. FIG. 13 is a graph obtained, when $T_B = 1.0$, by plotting expected values that represent the location of the bit, of those beyond the border, for which non-matching is to be detected relative to $\mu$.

The losing rate $P_{b5}$ is the probability whereat non-matching with a corresponding bit is not detected at all for a bit string of one cycle that extends across the actual border of the speech or music contents and the border can not be identified. The losing rate $P_{b5}$ is calculated using equation 13.

$$P_{b5} = 1 - \sum_{M=1}^{N} P_{b4}M$$ [Equation 13]

This value is extremely small, about $6.8 \times 10^{-9}$ when $\mu = 1.0$. It should be noted that these probabilities are calculated on the assumption that ½ is the probability whereat bits embedded in the speech or music contents match or do not match, and that the probabilities are not always established in actual cases. For example, when, for a bit string of one cycle that extends across the actual border of the speech or music contents, all bits but the last one accidentally match corresponding bits during the preceding cycle, the reliability associated with the identification of the location of the border of the speech or music contents is drastically reduced.

(3) detection method [3]: a method whereby identification of the location of a border is based on the detection strength of a digital watermark Normally, when the detection strengths of bits embedded in speech or music contents as a digital watermark are referred to, the distribution of bits differs in a portion wherein ID information is embedded and a portion wherein it is not embedded. Therefore, in accordance with the detection method [3], the detection strengths of bits are examined to determine the portion in the speech or music data whereat the speech or music contents begin and the portion whereat they end.

Figure 14:
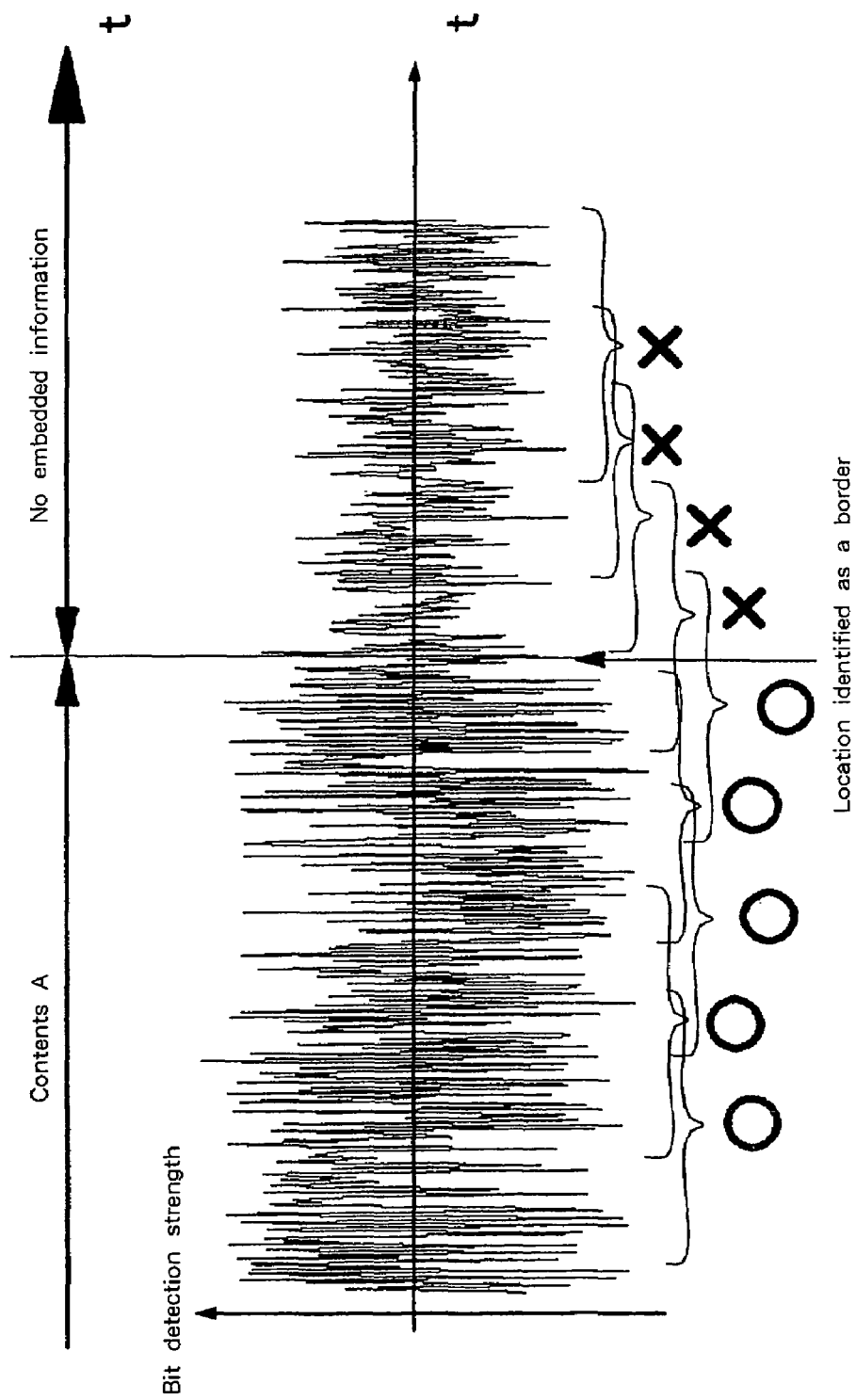
FIG. 14 is a diagram showing, for detection method [3], a difference in the detection strengths of bits between the location in speech or music data whereat a digital watermark is embedded and the location whereat a digital watermark is not embedded.

FIG. 14 is a diagram showing the difference in the detection strengths of bits between a location whereat a digital watermark is embedded and a location whereat no digital watermark is embedded.

In FIG. 14, whether a digital watermark is embedded in bits detected in the speech or music data is determined based on the detection strengths of an appropriate number of bits (the respective ranges indicated by O and x).

As is shown in FIG. 14, since the digital watermark (ID information "A") is embedded in the speech or music contents containing the ID information "A", the detection strength is high (dispersion is broad). Since the digital watermark is not embedded in a portion other than that of the speech or music contents, the detection strength is low (dispersion is narrow).

Many digital watermarks are normalized so that the detection strength in the speech or music contents in which no watermark is embedded conforms to the standard normal distribution. Therefore, when an appropriate number of bits are selected to determine whether the detection strengths of these bits conform to the standard normal distribution (e.g., the dispersion is compared with a threshold value), the portion wherein the digital watermark is embedded can be determined. In FIG. 14, the portion indicated by Os is the portion wherein, from the detection strengths of the bits, it is determined that a digital watermark is embedded, and the portion indicated by Xs is the portion wherein, from the detection strengths of the bits, it is determined that no digital watermark is embedded.

For the detection method [3], the reliability and the accuracy of the identification of the border of speech or music contents can be balanced by designating a number for the bit detection strengths used to determine the presence/absence of a digital watermark. When the presence/absence of a digital watermark is determined by using the detection strengths for multiple bits, while reliability is increased, accuracy is reduced.

This is similar to the detection method [1]. However, since this detection method [3] employs micro information, i.e., bit detection strengths, the border of speech or music contents can be identified more accurately than when the detection method [1] is used. However, since the detection strengths of a specific number of bits (10 to 30 bits) are required to determine how detection strengths are distributed, accuracy is accordingly reduced.

The detection method [3] is a method for determining the presence/absence of a digital watermark based on the detection strengths of bits, and is not related to the contents of the information that is embedded using the digital watermark. Therefore, the detection method [3] is appropriate for use for the detection of borders (borders in (i) and (ii)) where speech or music contents end or begin, but can not be used for the detection of a border (the border in (iii)) when the speech or music contents are switched and the ID information for the digital watermark is changed.

A further detailed explanation will now be given for the reliability and the accuracy of the identification of a border of speech or music contents.

First, when of $M_D$ bits there are $N_M$ bits for which the detection strengths exceed a threshold value $T_{DM}$, it is determined that a digital watermark is embedded in the pertinent area. The probability $P_{d1}$ whereat it will be determined that a digital watermark is embedded in an area wherein the average of the detected strength values is $\mu$ is obtained using equation 14.

$$P_{d1}(\mu, T_{DM}) = \sum_{x=N_M}^{N_D} \binom{x}{N_D}(1 - P_b(\mu - T_{DM}) + (P_b(\mu + T_{DM}))^x (P_b(\mu - T_{DM}) - P_b(\mu + T_{DM}))^{(N_D - x)}$$ [Equation 14]

In this equation, the probability is calculated whereat the number of bits, the detected values of which exceed a threshold value in the positive or negative direction, is equal to or greater than $N_M$ and equal to or smaller than $N_D$. When it is found that in $N_D$ bits there are $N_U$ bits or more for which the detected values are below the threshold value $T_{DU}$, it is ascertained that a digital watermark is not embedded in the pertinent area. The probability $P_{d2}$ whereat it will be ascertained that a digital watermark is not embedded in an area wherein the average of the detected values is $\mu$ is obtained using equation 15.

$$P_{d2}(\mu, T_{DU}) = \sum_{x=N_U}^{N_D} \binom{x}{N_D}(P_b(\mu - T_{DU}) + (P_b(\mu + T_{DU}))^x (1 - P_b(\mu - T_{DU}) - P_b(\mu + T_{DU}))^{(N_D - x)}$$ [Equation 15]

When an area wherein it is determined that a digital watermark is embedded and an area wherein it is determined that no digital watermark is embedded are contiguous, the border between these areas is identified as the speech or music contents border. In this case, the probability $P_{d3}$ whereat an area that actually does not exceed the border of the speech or music contents will be erroneously determined to be the border is obtained using equation 16.

$$P_{d3}(\mu, T_{DM}, T_{DU}) = P_{d1}(\mu, T_{DM}) P_{d2}(\mu, T_{DU})$$ [Equation 16]

For a case wherein, depending on the presence/absence of a digital watermark, N bits of ID information is separated every $N_D$ bits to identify a border, the erroneous adoption rate $P_{d4}$ whereat a border will be erroneously determined to be present in, at the least, one predetermined area is obtained using equation 17.

$$P_{d4}(\mu, T_{DM}, T_{DU}, N) = 1 - \left(\frac{(1 - P_{d1}(\mu, T_{DM}))}{P_{d2}(\mu, T_{DU}))^{\frac{N}{N_D}}}\right)$$ [Equation 17]

Further, the losing rate $P_{d5}$ whereat, even when the border of the speech or music contents has been transited, detection of this border will fail is obtained using equation 18.

$$P_{d5}(\mu, T_{DM}, T_{DU}) = 1 - P_{d1}(\mu, T_{DM}) P_{d2}(0, T_{DU})$$ [Equation 18]

The reliability and accuracy of the detection method [3], when used to identify a border of speech or music contents, depend greatly on the $N_D$ bits used to determine the presence/absence of a digital watermark.

FIGS. 15 to 22 are graphs showing the probabilities $P_{d1}$ and $P_{d2}$ when $N_D$ is 32, 16, 8 and 4, the probability whereat it may be determined that a digital watermark is present or absent, the probability $P_{d3}$, the erroneous adoption rate $P_{d4}$ and the losing rate $P_{d5}$.

Figure 15:
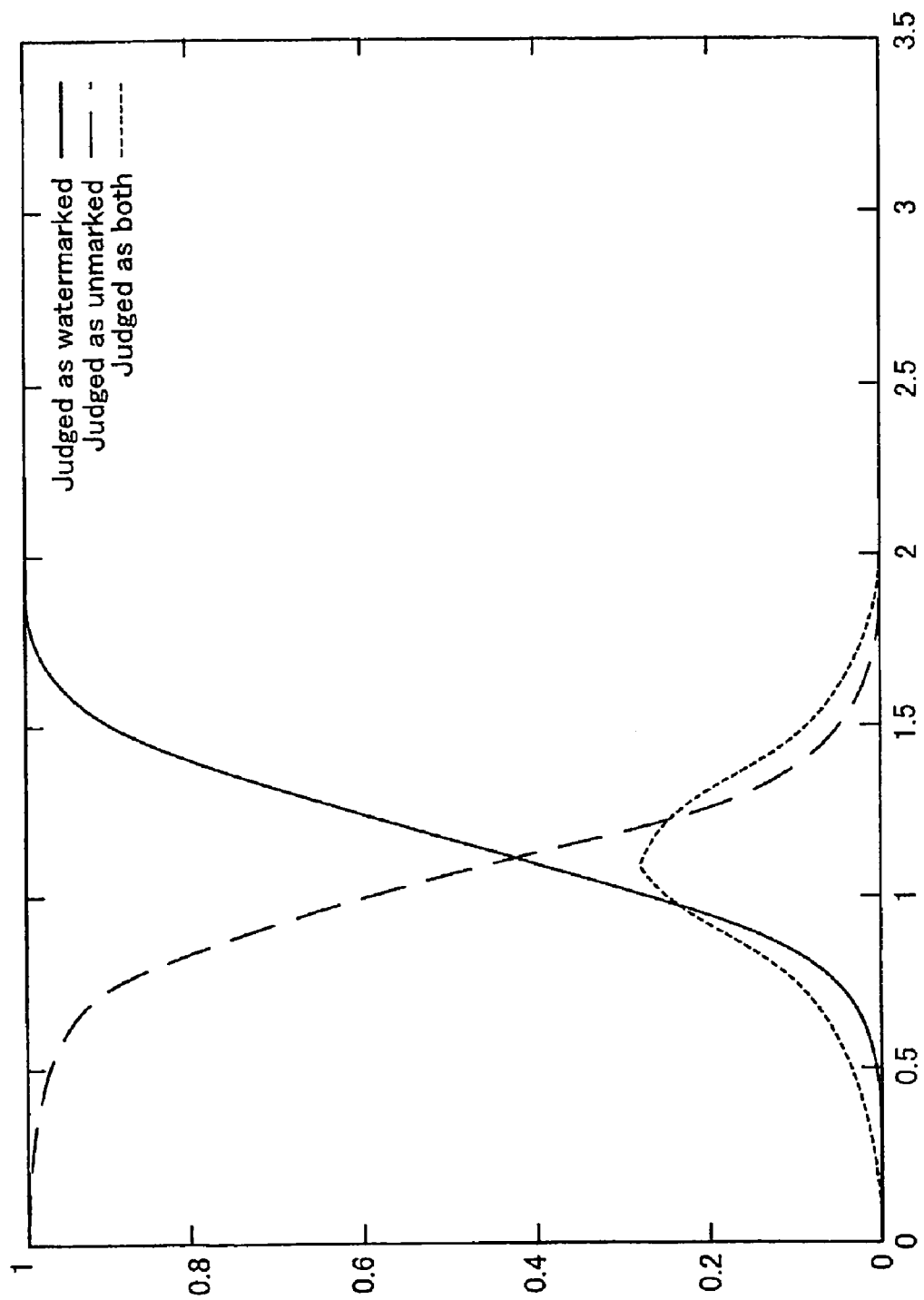
FIG. 15 is a graph showing the probability whereat, using detection method [3], the presence/absence of a digital watermark is determined when 32 bits are used for this determination.

FIG. 15 is a graph obtained by plotting the probability $P_{d1}$, whereat it is ascertained that a digital watermark will be embedded for $\mu$ when $N_D$=32, $T_{DM}$=2.0, $N_M$=7, $T_{DU}$=1.0 and $N_U$=20; the probability $P_{d1}$ whereat it will be ascertained that the digital watermark is embedded; the probability $P_{d2}$ whereat it will be ascertained that the digital watermark is not embedded; and the probabilities whereat it may be determined that the digital watermark is present or absent.

Figure 16:
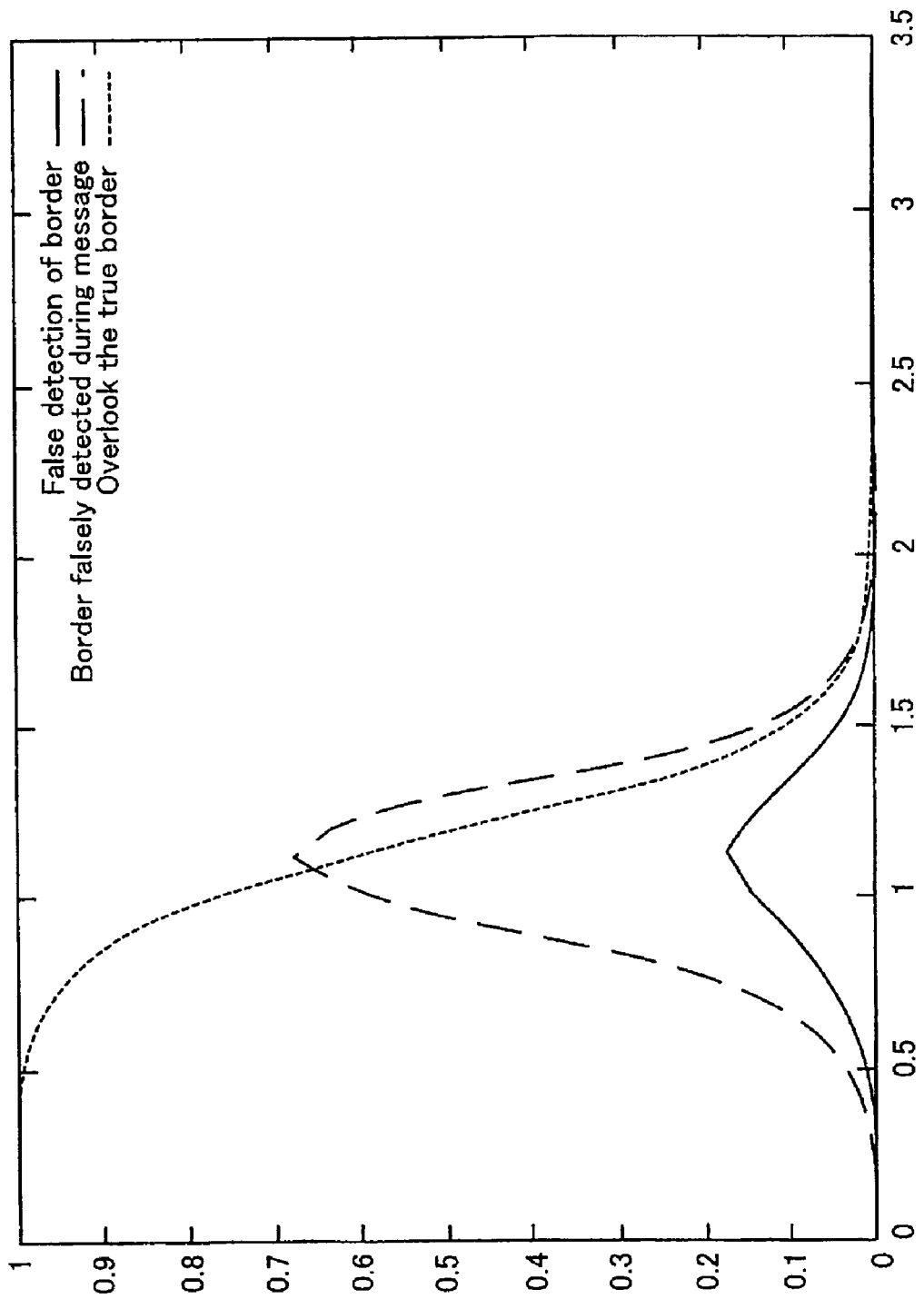
FIG. 16 is a graph showing the erroneous determination rate, the erroneous adoption rate and the losing rate using detection method [3] when 32 bits are employed for this determination.

FIG. 16 is a graph obtained by plotting the probability $P_{d3}$ whereat a border will be erroneously determined for $\mu$ when $N_D$=32, $T_{DM}$=2.0, $N_M$=7, $T_{DU}$=1.0, $N_U$=15 and N=128; the erroneous adoption rate $P_{d4}$ whereat it will be determined that the border is present in ID information in, at the least, one portion; and the losing rate $P_{d5}$ whereat the detection of an actual border of speech or music contents will fail.

Figure 17:
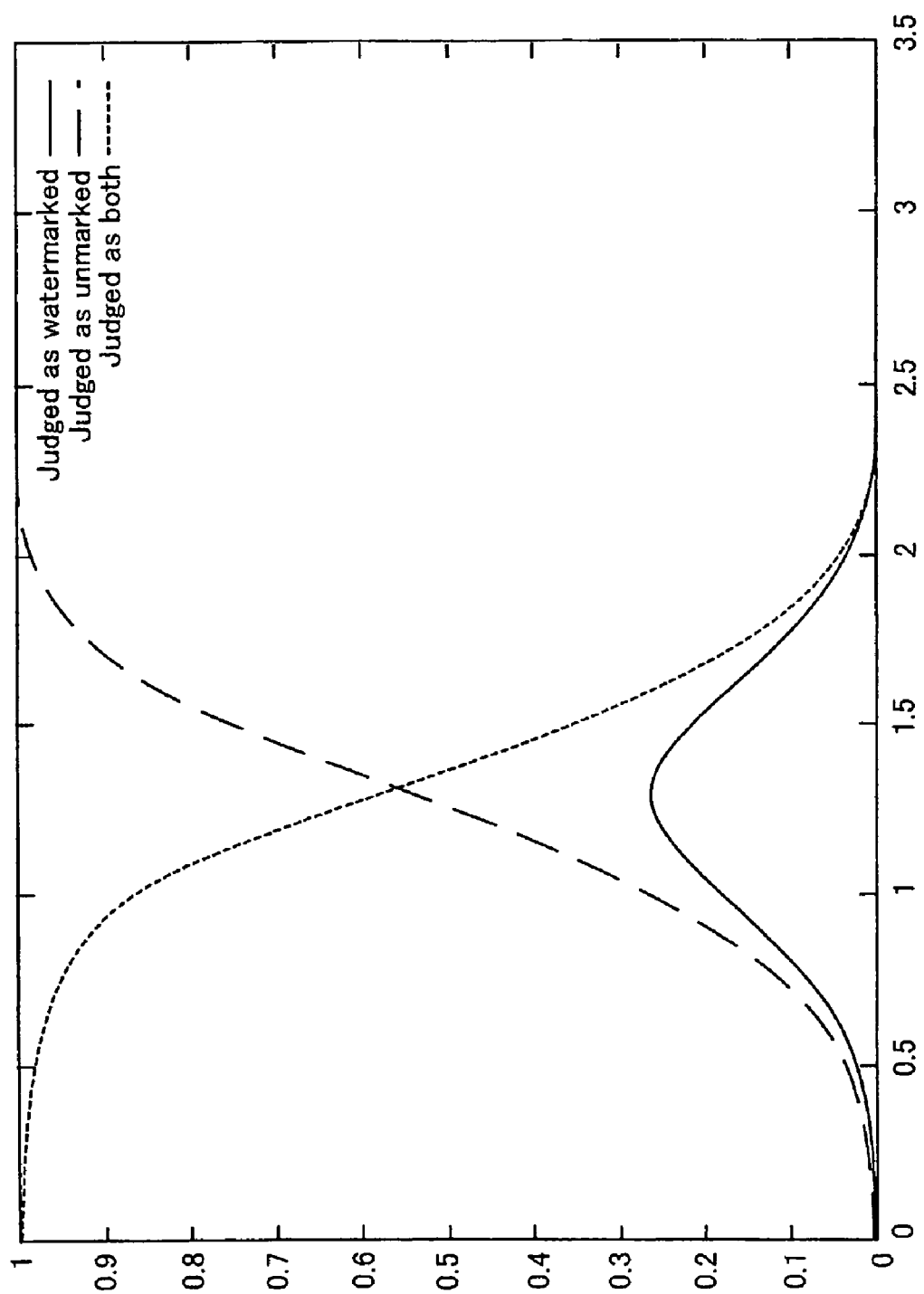
FIG. 17 is a graph showing the probability whereat, using detection method [3], the presence/absence of a digital watermark is determined when 16 bits are employed for this determination.

FIG. 17 is a graph obtained by plotting the probability $P_{d1}$ whereat it is ascertained that a digital watermark will be embedded for $\mu$ when $N_D$=16, $T_{DM}$=2.0, $N_M$=4, $T_{DU}$=1.0 and $N_U$=6; the probability $P_{d1}$ whereat it will be ascertained that the digital watermark has been embedded; the probability $P_{d2}$ whereat it will be ascertained that the digital watermark has not been embedded; and the probabilities whereat it may be determined that the digital watermark is present or absent.

Figure 18:
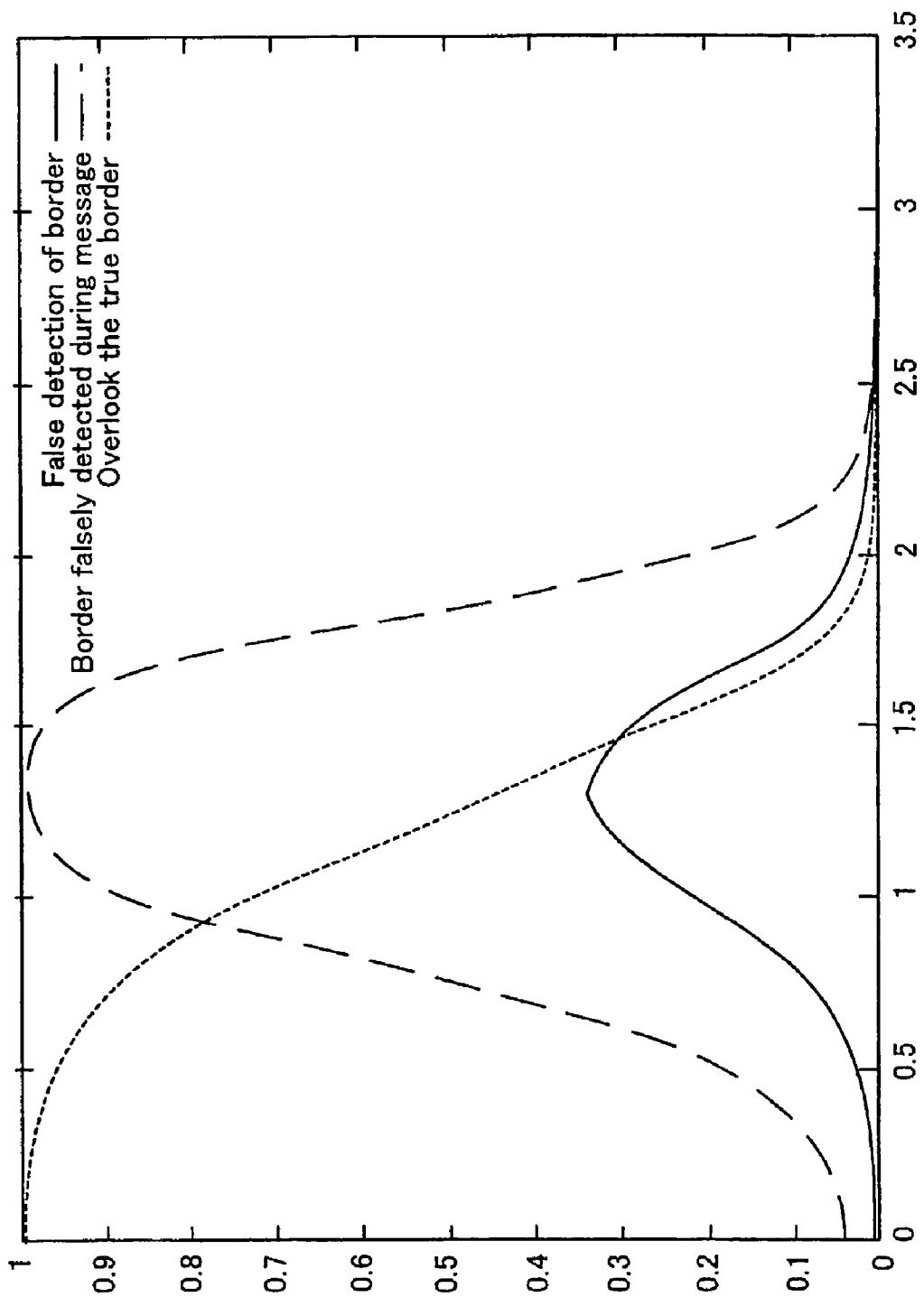
FIG. 18 is a graph showing the probability whereat, using detection method [3], the presence/absence of a digital watermark is determined when 16 bits are employed for this determination.

FIG. 18 is a graph obtained by plotting the probability $P_{d3}$ whereat the border will be erroneously determined for $\mu$ when $N_D$=16, $T_{DM}$=2.0, $N_M$=4, $T_{DU}$=1.0, $N_U$=6 and N=128; the erroneous adoption rate $P_{d4}$ whereat it is determined that the border will be present in ID information in, at the least, one portion; and the losing rate $P_{d5}$ whereat the detection of the actual border of the speech or music contents will fail.

Figure 19:
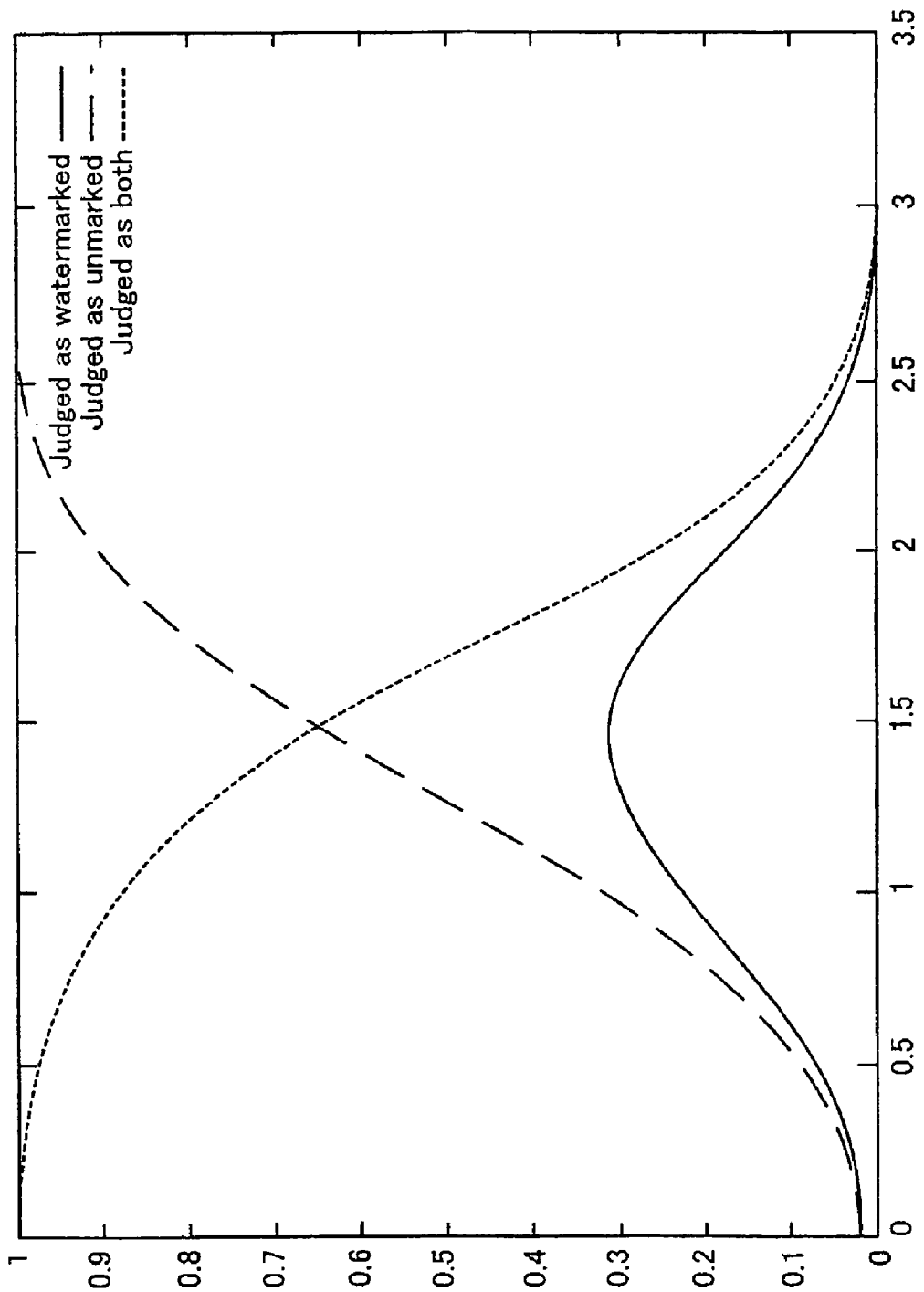
FIG. 19 is a graph showing the probability whereat, using detection method [3], the presence/absence of a digital watermark is determined when 8 bits are employed for this determination.
Figure 20:
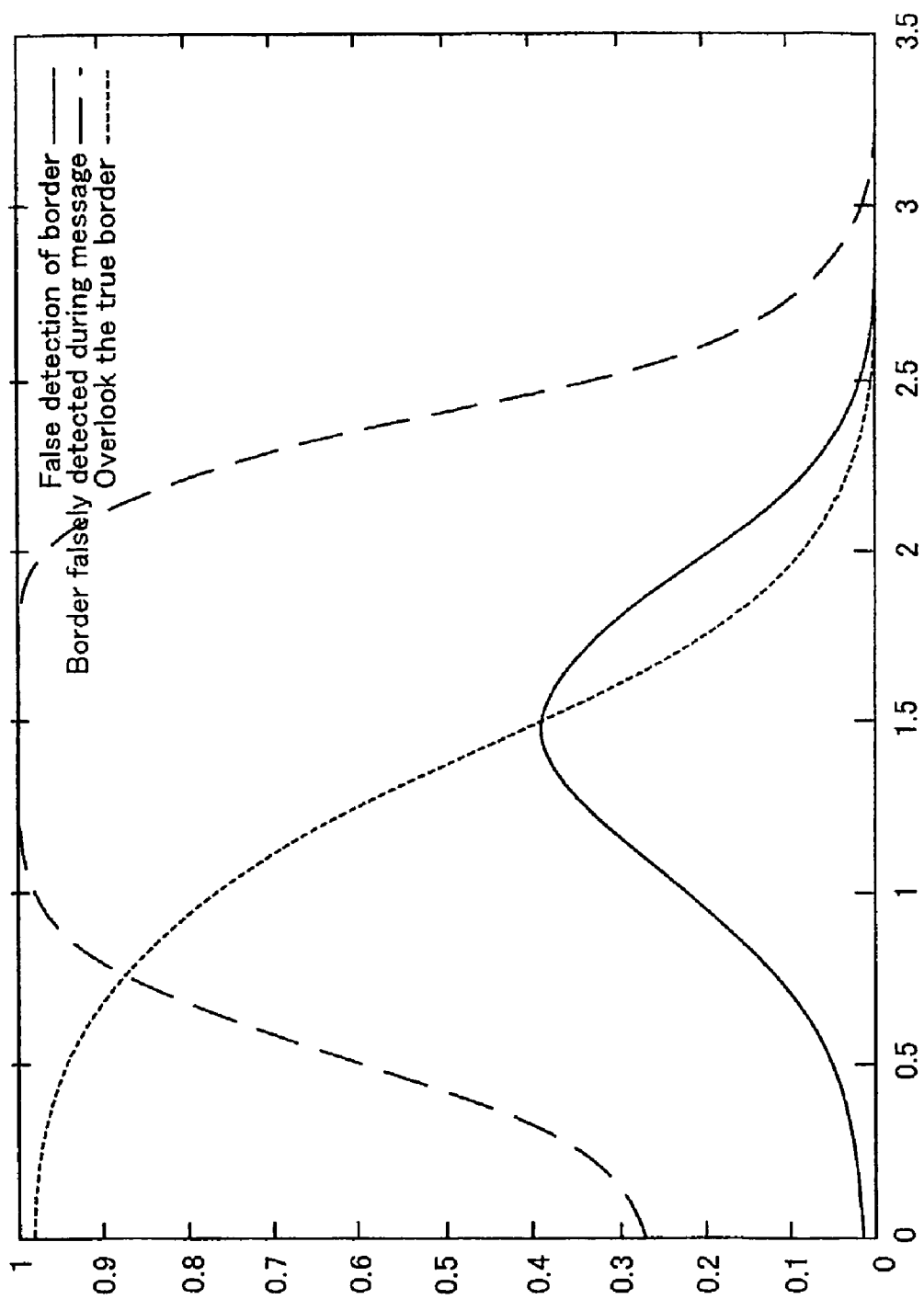
FIG. 20 is a graph showing the probability whereat, using detection method [3], the presence/absence of a digital watermark is determined when 8 bits are employed for this determination.

FIG. 19 is a graph obtained by plotting the probability $P_{d1}$ whereat it will be ascertained that a digital watermark has been embedded for $\mu$ when $N_D$=8, $T_{DM}$=2.2, $N_M$=2, $T_{DU}$=1.5 and $N_U$=4; the probability $P_{d1}$ whereat it will be ascertained that the digital watermark has been embedded; the probability $P_{d2}$ whereat it will be ascertained that the digital watermark has not been embedded; and the probabilities whereat it may be determined that the digital watermark is present or absent. FIG. 20 is a graph obtained by plotting the probability $P_{d3}$ whereat a border will be erroneously determined for μ when $N_D$=8, $T_{DM}$=2.2, $N_M$=2, $T_{DU}$=1.5, $N_U$=4 and N=128; the erroneous adoption rate $P_{d4}$ whereat it will be determined that the border is present in ID information in, at the least, one portion; and the losing rate $P_{d5}$ whereat the detection of the actual border of the speech or music contents will fail.

Figure 21:
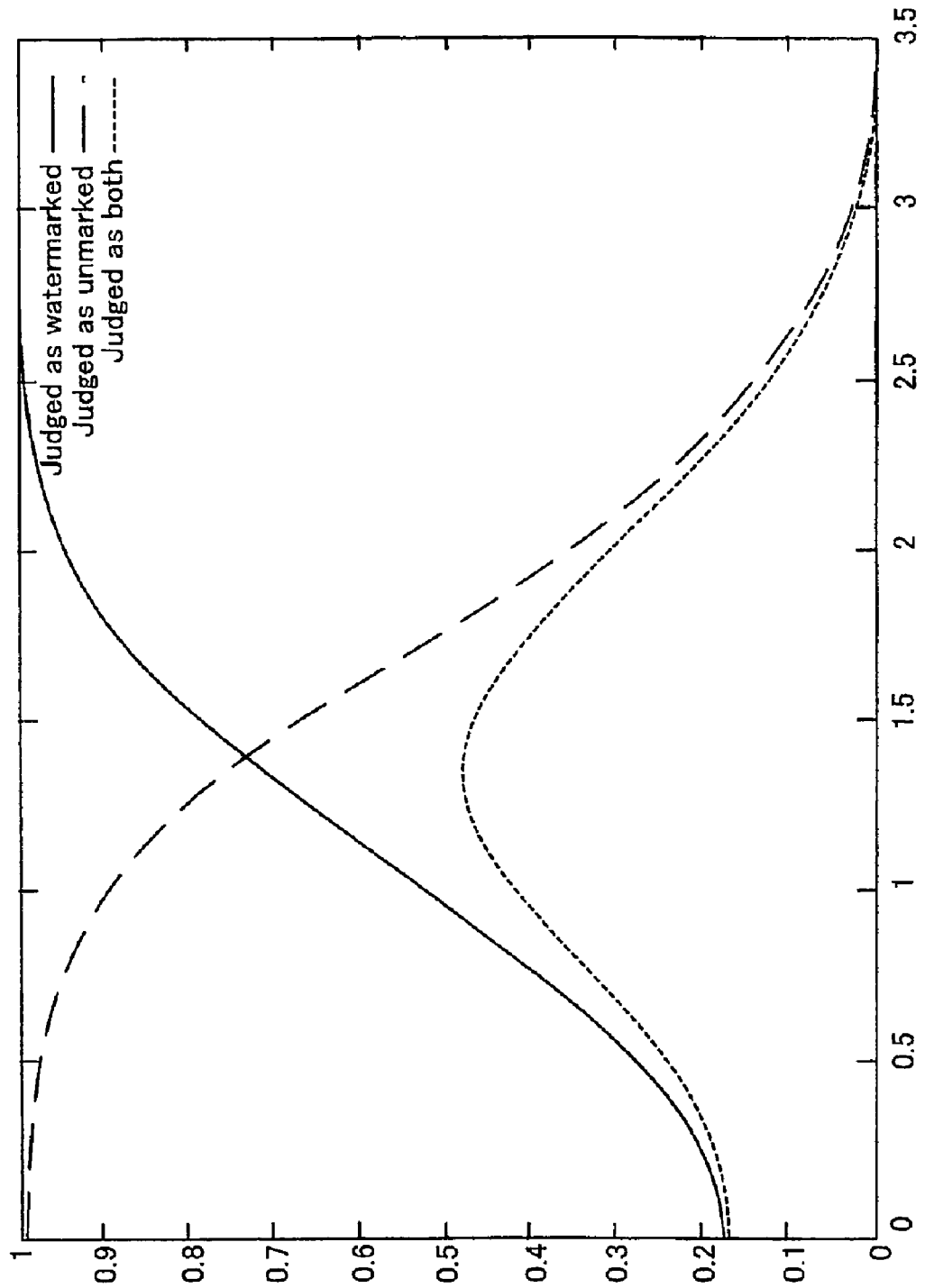
FIG. 21 is a graph showing the probability whereat, using detection method [3], the presence/absence of a digital watermark is determined when 4 bits are employed for this determination.
Figure 22:
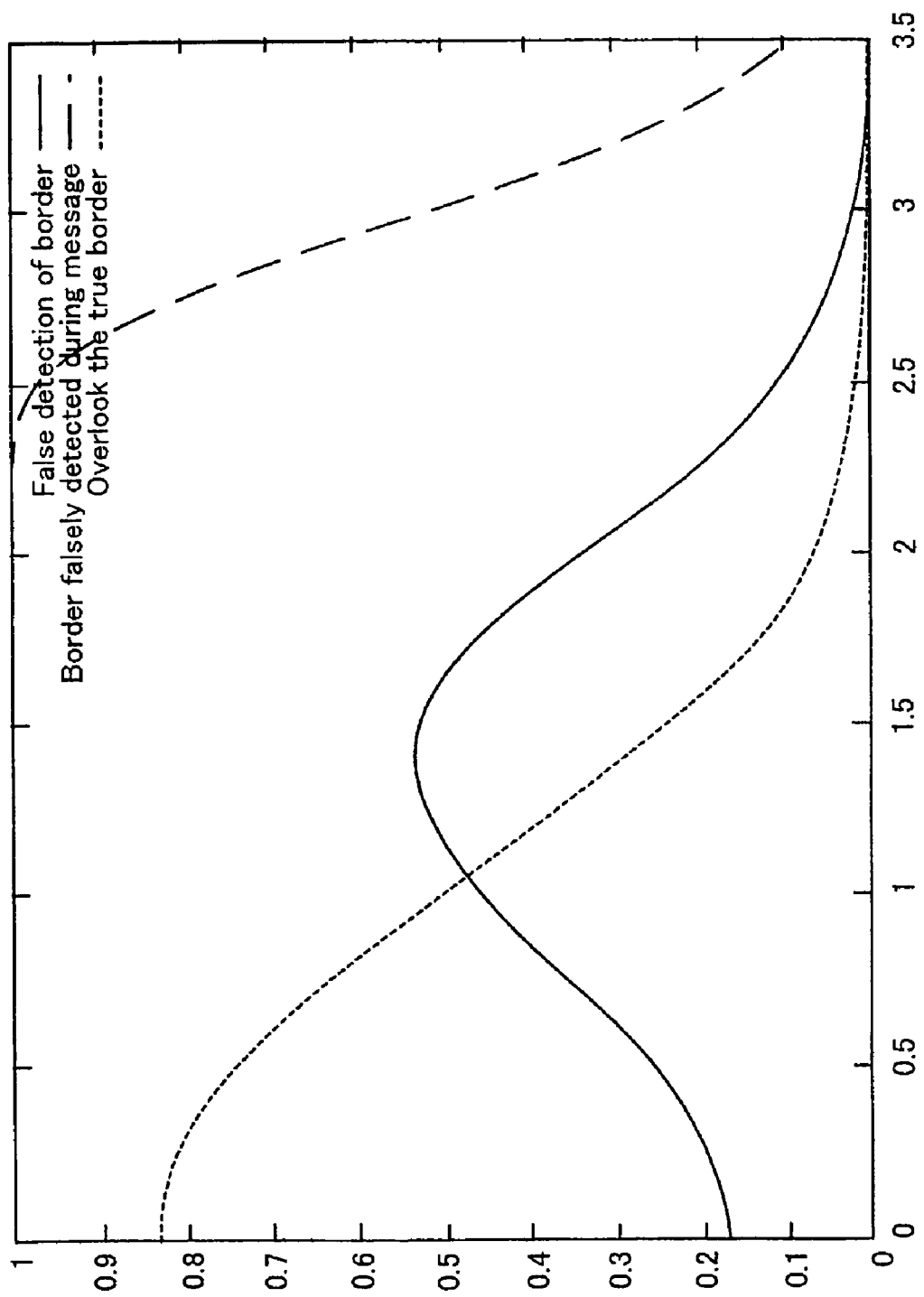
FIG. 22 is a graph showing the probability whereat, using detection method [3], the presence/absence of a digital watermark is determined when 4 bits are employed for this determination.

FIG. 21 is a graph obtained by plotting the probability $P_{d1}$ whereat it will be ascertained that a digital watermark has been embedded for μ when $N_D$=4, $T_{DM}$=2.0, $N_M$=1, $T_{DU}$=1.5 and $N_U$=2; the probability $P_{d1}$ whereat it will be ascertained that the digital watermark has been embedded; the probability $P_{d2}$ whereat it will be ascertained that the digital watermark has not been embedded; and the probabilities whereat it may be determined that the digital watermark is present or absent. FIG. 22 is a graph obtained by plotting the probability $P_{d3}$ whereat a border will be erroneously determined for μ when $N_D$=4, $T_{DM}$=2.0, $N_M$=1, $T_{DU}$=1.5, $N_U$=2 and N=128; the erroneous adoption rate $P_{d4}$ whereat it will be determined that the border is present in ID information in, at the least, one portion; and the losing rate $P_{d5}$ whereat the detection of the actual border of the speech or music contents will fail.

The threshold values in these graphs are so selected that when the value of μ is sufficiently great, the value of $P_{d1}$ approaches 1 and the value of $P_{d2}$ approaches 0, and when the value μ is around 0, the value of $P_{d3}$ approaches 0 and the value of $P_{d2}$ approaches 1. When the graphs are compared, as the number $N_D$ of the bits used for the determination is small, the values of $P_{d1}$ and $P_{d2}$ change gradually, and the probability whereat the absence of a digital watermark may be determined is increased, even by a slight deterioration of μ. That is, it is found that when the accuracy with which a border of speech or music contents is identified is increased, there is a countervailing increase in the erroneous adoption rate.

Since $P_{d3}$ (0, $T_{DM}$, $T_{DU}$) is the probability whereat a border of speech or music contents will be erroneously determined for an area wherein no digital watermark is embedded, the probability $P_{d6}$ whereat it will be ascertained that the first detection of the border will occur at a location M bits beyond the actual border is obtained using equation 19.

$$P_{d6}(T_{DM}, T_{DU}) = P_{d3}(0, T_{DM}, T_{DU})(1-P_{d3}(0, T_{DM}, T_{DU}))^{(M-1)} \quad [\text{Equation 19}]$$

Since this value is small, it is rare indeed that it will be ascertained that the border of the speech or music contents is present at a location whereat no digital watermark is embedded.

(4) detection method [4]: a method whereby the identify of the location of a border is based on the continuity of the synchronized positions of ID information According to many digital watermarking techniques, contents are separated into predetermined lengths (frames in this embodiment) along the time axis, and information is embedded in each of the frames that are thus obtained. For the detection of embedded information, a synchronization process is performed to detect the head of a frame, and then the embedded information in the pertinent frame is detected.

According to the detection method [4], the location of a border of speech or music contents is determined based on a pattern wherein a digital watermark appears in synchronized positions.

Figure 23:
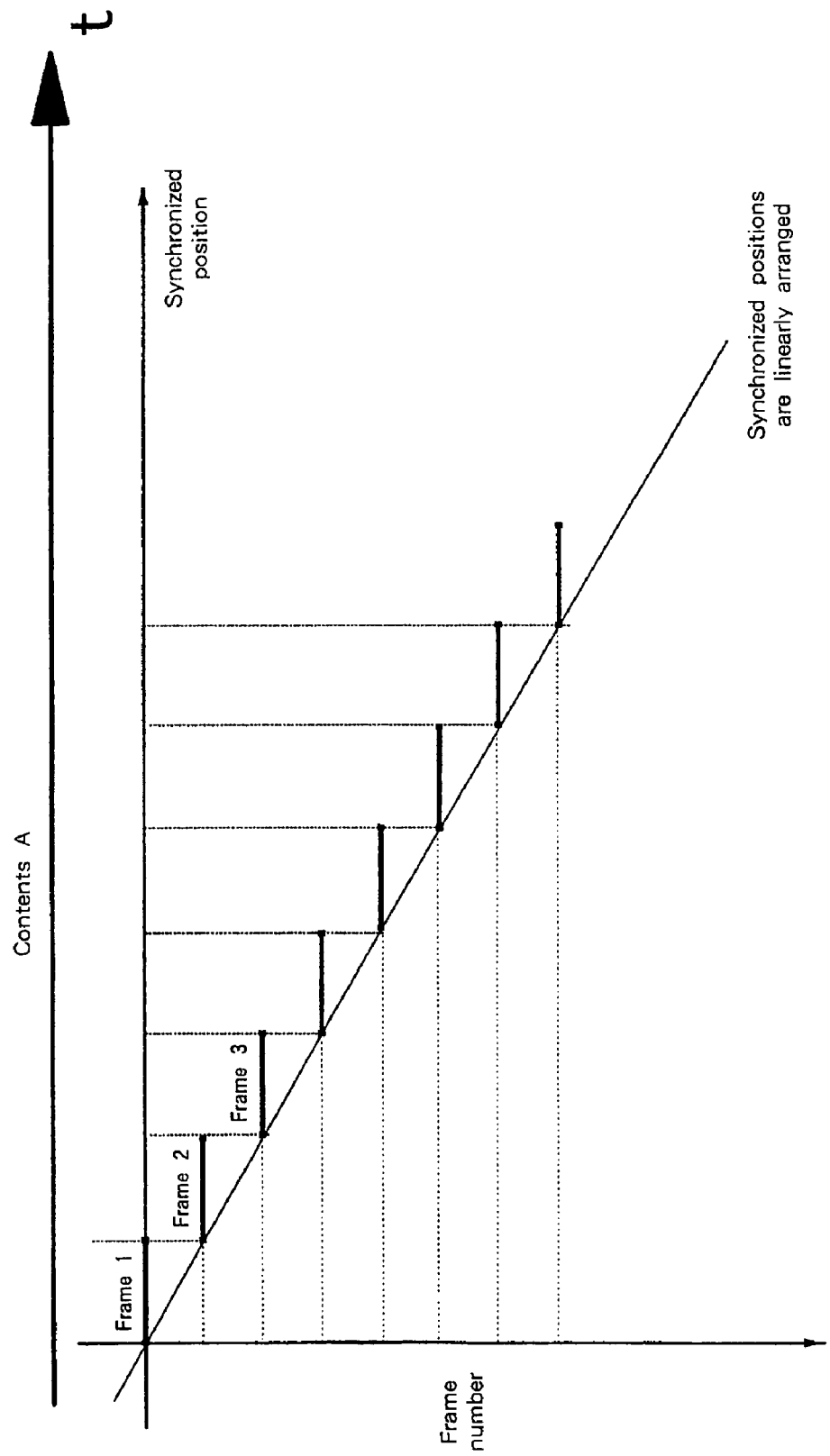
FIG. 23 is a diagram for explaining, for detection method [4], the synchronized positions of digital watermarks embedded in speech or music contents.

FIG. 23 is a diagram for explaining the synchronized positions for a digital watermark embedded in speech or music contents.

In FIG. 23, ID information for a digital watermark is embedded in each of the frames, the heads of which are located at synchronized positions from which synchronization signals are detected. As a result, synchronization can be provided for the detection of the ID information.

Generally, since the same information is repetitively embedded in the speech or music contents, as is shown in FIG. 23, the synchronized positions appear in the speech contents at predetermined, like intervals (arranged linearly).

Figure 24:
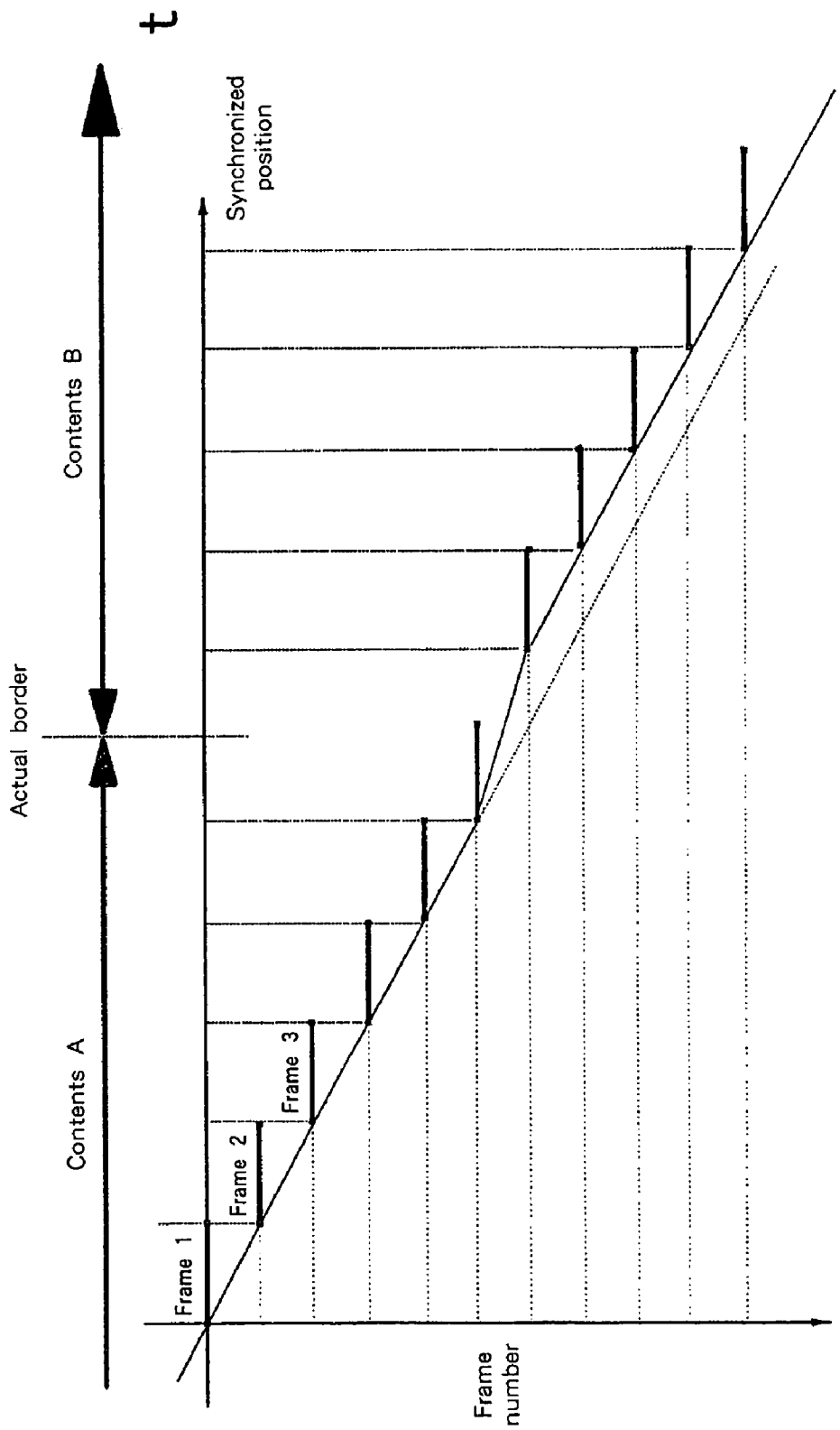
FIG. 24 is a diagram for explaining, for detection method [4], how the synchronized positions of the digital watermark appear when speech or music contents are switched.

FIG. 24 is a diagram for explaining how the synchronized positions occupied by the digital watermark appear when speech or music contents are switched.

When speech or music contents are switched, before and after the switch the synchronized positions appear in the speech or music contents at the same intervals as are shown in FIG. 23. However, as is shown in FIG. 24, the intervals used for the synchronized positions vary at border locations whereat changes in speech or music contents occur.

Figure 25:
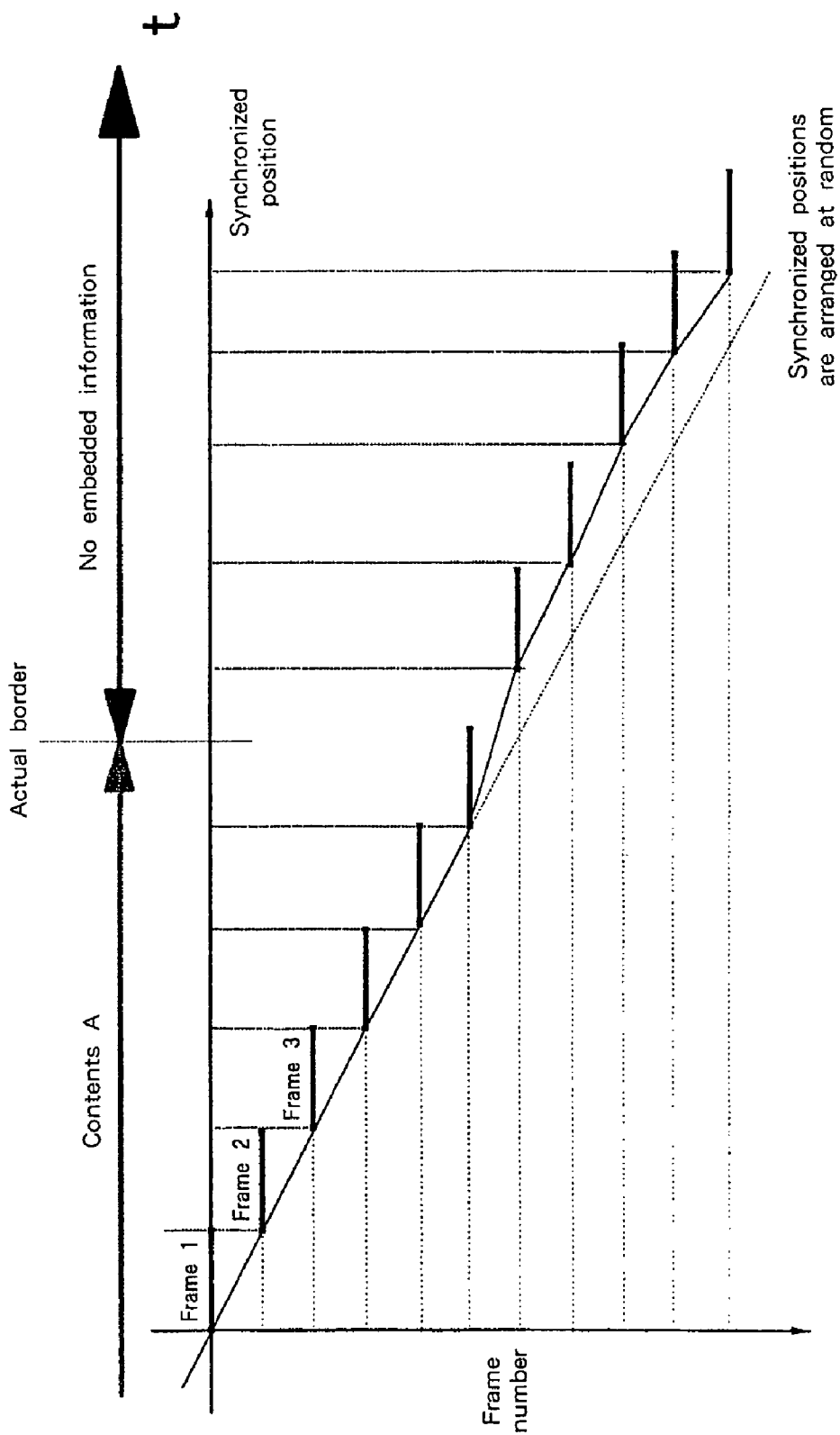
FIG. 25 is a diagram for explaining, for detection method [4], how the synchronized positions of the digital watermark appear when speech or music contents are ended.

FIG. 25 is a diagram for explaining the appearance presented by the synchronized positions of a digital watermark when the end of speech or music contents is reached.

Before the end of the speech or music contents, and of the embedding of the digital watermark, is reached, the synchronized positions appear in the speech or music contents at the same like intervals as are shown in FIG. 23; while once the end of the speech or music contents is reached, and the embedding of the digital watermark halted, the regularity with which the synchronized positions previously appeared is lost, and in the synchronization process, as is shown in FIG. 25, the synchronized positions appear at irregular intervals.

Furthermore, although not shown, once speech or music contents begin, at that point the synchronized positions, which appear at irregular intervals in FIG. 25, begin to appear regularly at corresponding intervals.

As is described above, the manner in which synchronized positions used for the detection of a digital watermark appear is changed at a position whereat speech or music contents are switched, and at positions whereat speech or music contents start and end. Therefore, a position whereat the pattern according to which synchronized positions appear in frames is changed can be determined to be a border of the speech or music contents. Therefore, according to the detection method [4], a border location can be detected for all three of the border types described above.

According to the detection method [4], as is described above, a position whereat the pattern according to which synchronized positions appear in frames is changed can be determined to be a border of speech or music contents. Therefore, since a border of speech or music contents can be provided at any frame, the accuracy with which a border of speech or music contents can be identified is extremely high.

When deterioration of the bits embedded as a digital watermark in a speech or music contents area occurs, the intervals whereat synchronized positions appear in speech or music contents become irregular, and the erroneous identification of a border of speech or music contents is probable. Therefore, in this instance the reliability of an identification of the border of the speech or music contents is low.

A more detailed explanation will now be given of the reliability and the accuracy the detection method [4] provides for the identification of a border of speech or music contents.

For the synchronization of the digital watermark detection process, preceding synchronized positions are employed to predict the next $N_s$ synchronized positions. Synchronization signals for synchronization control conform to a standard normal distribution when a digital watermark is not embedded, or at positions other than at synchronized positions, even when a digital watermark is embedded. In this case, the presence of a border can be detected by determining whether the detection results obtained at the $N_s$-th synchronized position conform to the standard normal distribution.

There is a case wherein a positive value is embedded in a synchronization signal and a case wherein a negative value is embedded. If it can not be predicted which value is embedded, a process, such as is used in the detection method [3], for determining whether a digital watermark is embedded can be employed. The probability $P_{e1}$ whereat, when a digital watermark is present in speech or music data and synchronized positions are not shifted, it will be erroneously determined that the border of the speech or music contents is present is obtained using equation 20.

$$P_{e1}(\mu, T_{EM}) = \sum_{x=N_U}^{N_D} \binom{x}{N_s}(P_b(\mu - T_{EM}) - \qquad \text{[Equation 20]}$$
$$(P_b(\mu + T_{EM}))^x (1 - P_b(\mu - T_{EM}) +$$
$$P_b(\mu + T_{EM}))^{(N_s - x)}$$

When a positive value is always embedded in a synchronization signal, the total of the $N_s$ detected synchronization signals is compared with a threshold value to determine whether the synchronization signals conform to the standard normal distribution.

According to the detection method [4], when speech or music contents are deteriorated and the synchronized positions used for the detection of a digital watermark appear irregularly, borders are erroneously detected at many portions in the speech or music contents. Therefore, preferably, this method is employed not only for the identification of the location of a border, but is also, together with another method, employed to increase the accuracy of an identification of the location of a border.

(5) detection method [5]: a method whereby a special bit is used to identify the location of a border According to the detection methods [1] to [4], a border location is detected by using a digital watermark that is already embedded in speech or music contents in order to add ID information, while according to the detection method [5], special bits (hereinafter referred to as border detection bits), which are prepared for the detection of a border, are embedded in speech or music contents, and the location of a border of the speech or music contents is identified by analyzing the border detection bits that are detected.

Figure 26:
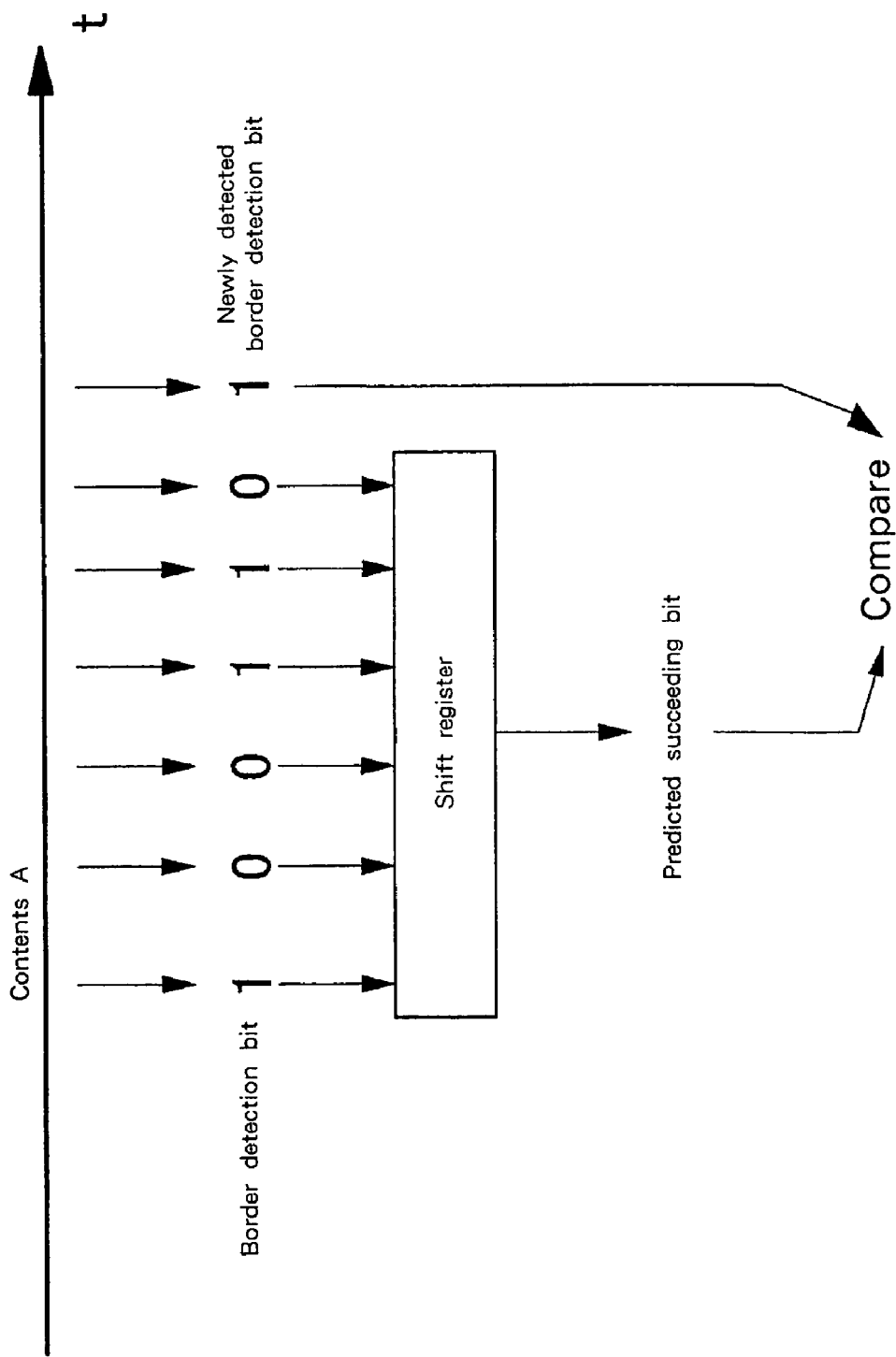
FIG. 26 is a diagram for explaining, for detection method [5], the structure of border detection bits that are embedded as a digital watermark in speech or music contents.

FIG. 26 is a diagram for explaining the structure of border detection bits that are embedded as a digital watermark in speech or music contents.

In FIG. 26, border detection bits that have already been detected are arranged in the order 100110, and a new border detection bit, a 1, is detected.

The border detection bits are embedded in speech or music contents in accordance with a specific rule whereby each bit embedded is provided for a predetermined number of bits of ID information. Therefore, the total number of bits embedded as a digital watermark in speech or music contents is increased.

Further, the coherence of a sequence of border detection bits is examined to detect a border of speech or music contents using the border detection bits. That is, so long as the border detection bits that are detected are arranged in accordance with a specific rule, i.e., so long as the border detection bit that is to be detected next can be predicted, the speech or music contents are continued. When a border detection bit does not conform to the rule, i.e., when the next border detection bit is not the one predicted, the position of the border detection bit that does not conform to the prediction is the location of the border of the speech or music contents.

Further, information to be embedded in speech or music contents as border detection bits must be prepared, so that the probability is low that coherence will fortuitously be maintained, even though a border of speech or music contents is present. It is also preferable that the presence/absence of coherence be determined by using the minimum number of bits.

Assume that an N-th order M sequence is embedded as border detection bits. Since the length of an N-th order M sequence is $(2^N-1)$, the M sequence is repetitively embedded and has a $(2^N-1)$ cycle. Therefore, the probability whereat the coherence of the border detection bits will accidently be maintained, even though the border of speech or music contents has been passed, is $1/(2^N-1)$. For an N-th order M sequence, the next bit is determined by using N bits. Therefore, the N border detection bits that were last detected are employed to predict the immediately succeeding bit. When the succeeding border detection bit that is actually detected does not correspond to the prediction result, it is assumed that coherence has been lost, and the pertinent location is determined to be the location of the border of the speech or music contents. The advantages accrued by using the M sequence are that the cycle $(2^N-1)$ is long and that only a small number N of bit histories is required to determine the coherence.

It is preferable that in this method, as in the detection method [2], a threshold value be established in order to prevent the erroneous detection of a border in a deteriorated portion. The detection strength should be reliably large for the N border detection bits used to predict a succeeding border detection bit, and relative to the succeeding border detection bit, a border of speech or music contents should be determined only when the coherence of the bits is lost.

As is described above, according to the detection method [5] a border of speech or music contents can be identified by the unit of one bit, and the accuracy with which a border can be identified is very high.

Whereas, since an erroneous detection may occur due to the deterioration of speech or music contents, or since the coherence of border detection bits may be accidently maintained, even though a border of speech or music contents has been passed, the reliability relative to a border location identification is slightly reduced.

However, if multiple border detection bits can be arranged in parallel, both the reliability and the accuracy can be increased. But in this case, the number of bits that must be embedded as a digital watermark is further increased.

In order to prevent an increase in the number of bits that must be embedded in speech or music contents, the range for the embedding of border detection bits can be set equal to the number of bits used for embedding ID information. In this case, however, the amount of ID information must be reduced. In addition, a bit sequence that consists of ID information and can also be used as border detection bits can be embedded; however, setting up set such a bit sequence is not easy.

A more detailed explanation will now be given for the reliability and the accuracy of the detection method [5] when used for the identification of a border of speech or music contents.

Assume that the order of an M sequence is D. When the last of the D bits and one additional border detection bit have been detected, so that the detection strengths of these bits exceed a threshold value $T_c$, the coherence of the bits is examined. That is, whether a prediction based on the M sequence matches or does not match last detected border detection bit is determined.

In this case, the probability $P_{c1}$ whereat non-matching will be erroneously detected, even though the border detection bit does not represent the border of speech or music contents, is obtained using equation 21.

$$P_{c1}(T_c)=P_b(\mu+T_c)(1-P_b(\mu-T_c))^D \quad \text{[Equation 21]}$$

Figure 27:
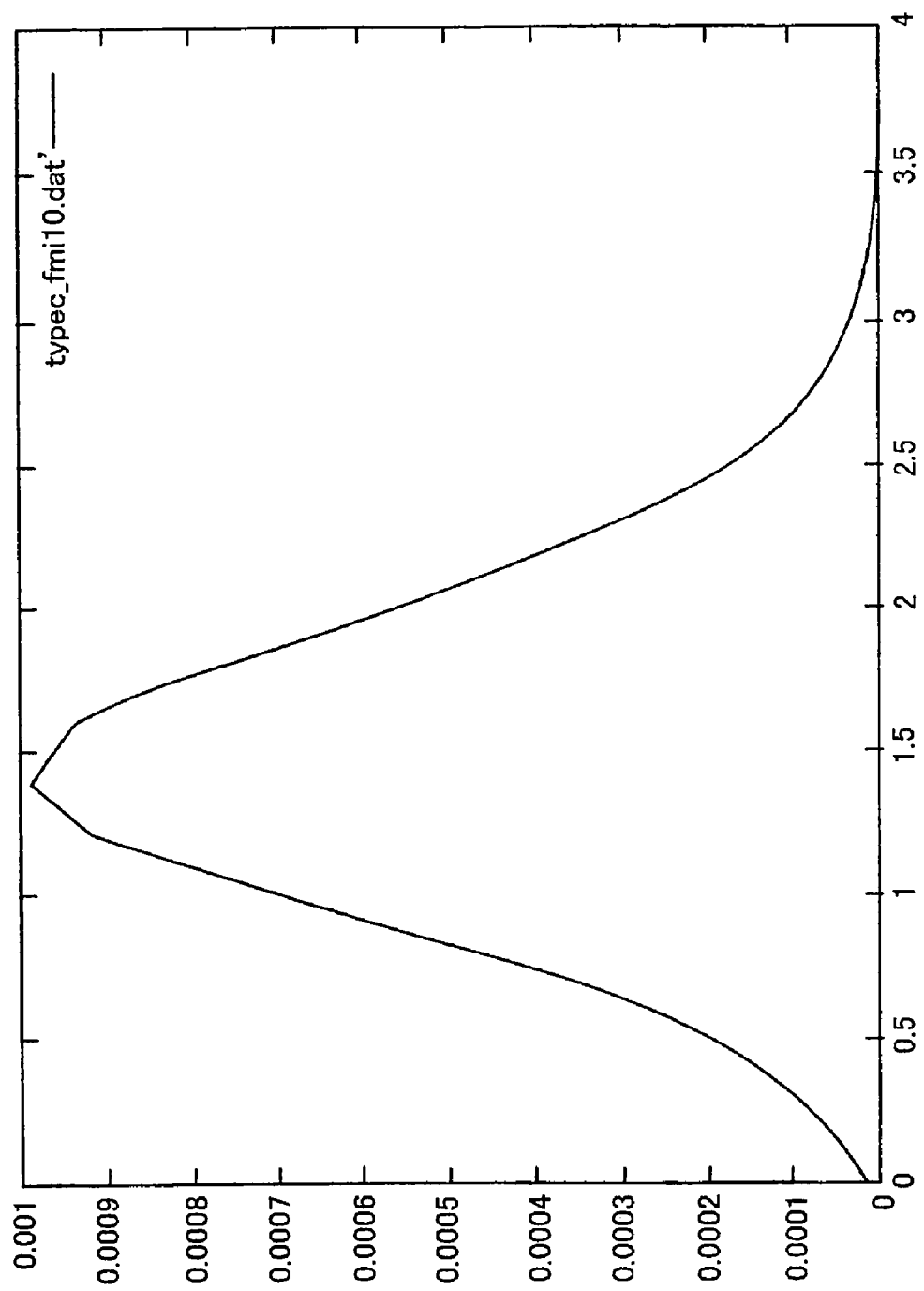
FIG. 27 is a graph showing the probability whereat, using detection method [5], non-matching is erroneously detected, even though the border of the speech or music contents is not located.

FIG. 27 is a graph obtained by plotting the probability $P_{c1}$ whereat when $T_c=1.0$ and D=5 non-matching will be erroneously detected relative to a $\mu$ change.

The probability $P_{c2}$, whereat non-matching will be erroneously detected in one portion, at the least, in the N bits is obtained using equation 22.

$$P_{c2}(T_c, N)=1-(1-P_{c1}(T_c))^N \quad \text{[Equation 22]}$$

Figure 28:
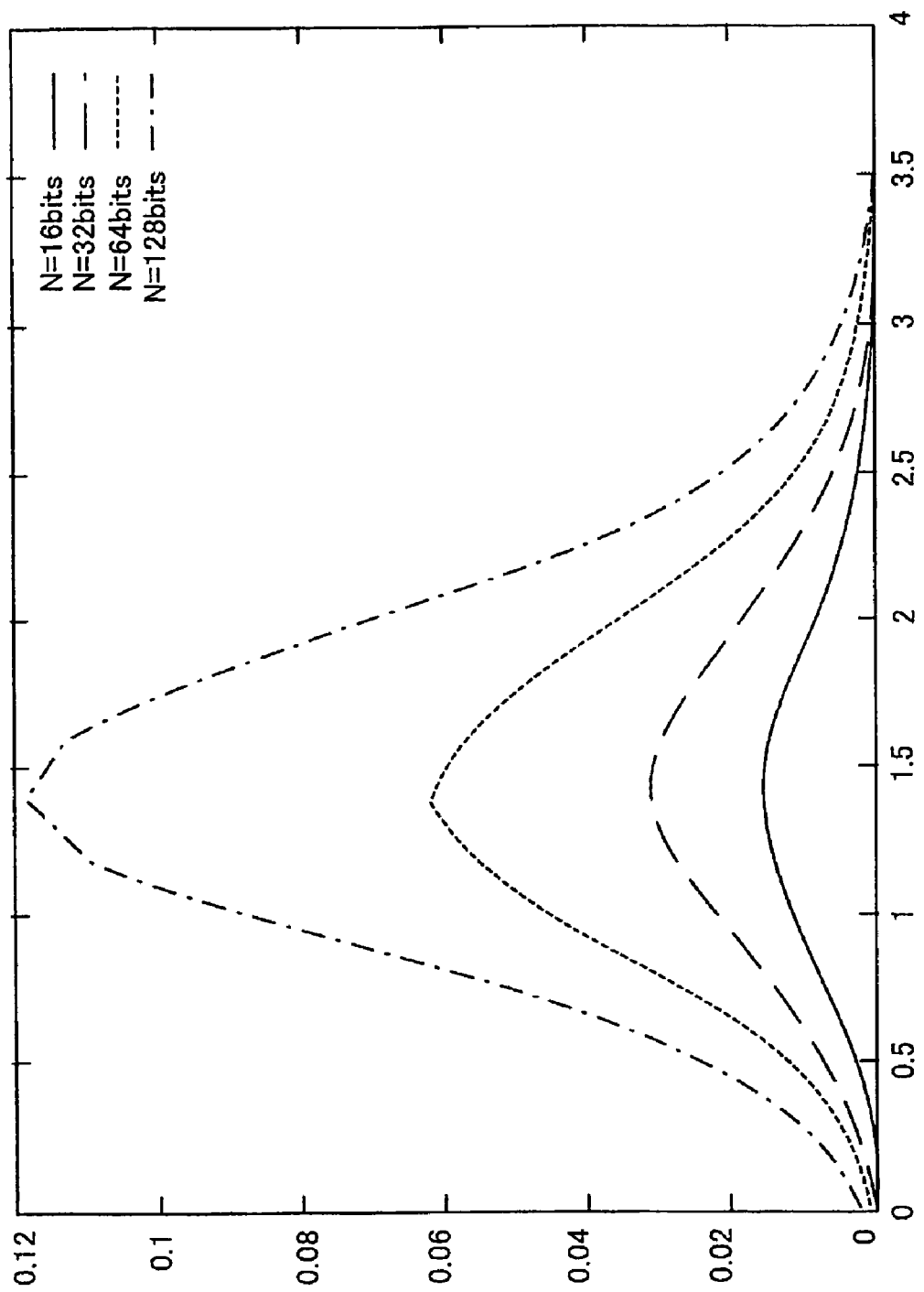
FIG. 28 is a graph showing the probability whereat, using detection method [5], non-matching is erroneously detected at one portion, at the least, in a predetermined range of N bits.

FIG. 28 is a graph obtained by plotting the probability $P_{c2}$ whereat when $T_c=1.0$ and D=5 non-matching will be erroneously detected in one portion, at the least, in N bits relative to the $\mu$ change. As is apparent from FIG. 28, when the ID information is long, the erroneous adoption rate is considerably lower than that for the detection method [2], while it can not be said that the erroneous detection of non-matching will occur.

The probability $P_{c3}$ whereat a non-matching bit is detected at a distance of one bit following the border of the speech or music contents is obtained using equation 23.

$$P_{c3}(T_C,1) = (1-P_b(\mu-T_C))^D \left\{ \frac{1}{2} P_b(\mu+T_C) + \frac{1}{2}(1-P_b(\mu-T_C)) \right\} \quad \text{[Equation 23]}$$

This equation is based on the assumption that ½ is the probability whereat, even though speech or music contents are extended and pass the border, the same border detection bit as that in the speech or music contents will be unintentionally embedded in the other contents. This equation is established by adding the probability whereat non-matching is detected because of the deterioration of bits for which coherence is originally maintained, and the probability whereat non-matching is determined by the detection of bits for which coherence is not originally maintained.

Furthermore, the probability $P_{c3}$ whereat the bit that is detected M bits after the border of the speech or music contents is passed will not match the predicted bit is obtained using equation 24.

$$P_{c3}(T_C,M) = \frac{1}{2}(1-P_b(\mu-T_C))^{(D-M-1)} (1-P_b(\mu-T_C)+P_b(\mu+T_C))^M \quad \text{[Equation 24]}$$

When different speech or music contents are contiguously arranged, and when the border of the first speech or music contents has been passed, the digital watermark for the succeeding speech or music contents is detected, and the M sequence of that portion will again achieve coherence. Therefore, a border of speech or music contents can not be identified based on the non-matching of the bit predicted using the M sequence and the border detection bit that is actually detected. When a digital watermark is not embedded at the location whereat the border of the speech or music contents is passed, the probability $P_{c3}$ whereat the bit predicted using the M sequence and the actual bit detected for the border will not match is obtained using equation 25.

It should be noted that this probability is extremely low.

$$P_{c3}(T_C,x) = \frac{1}{2}(1-P_b(0-T_C)+P_b(0+T_C))^{(D+1)} \quad \text{[Equation 25]}$$

The probability $P_{c4}$ whereat a non-match will first be detected M bits after the border of the speech or music contents is passed is obtained using equation 26.

$$P_{c4}(M) = P_{c3}(T_C,M) \prod_{x=1}^{M-1} \{1-P_{c3}(T_C,x)\} \quad \text{[Equation 26]}$$

Figure 29:
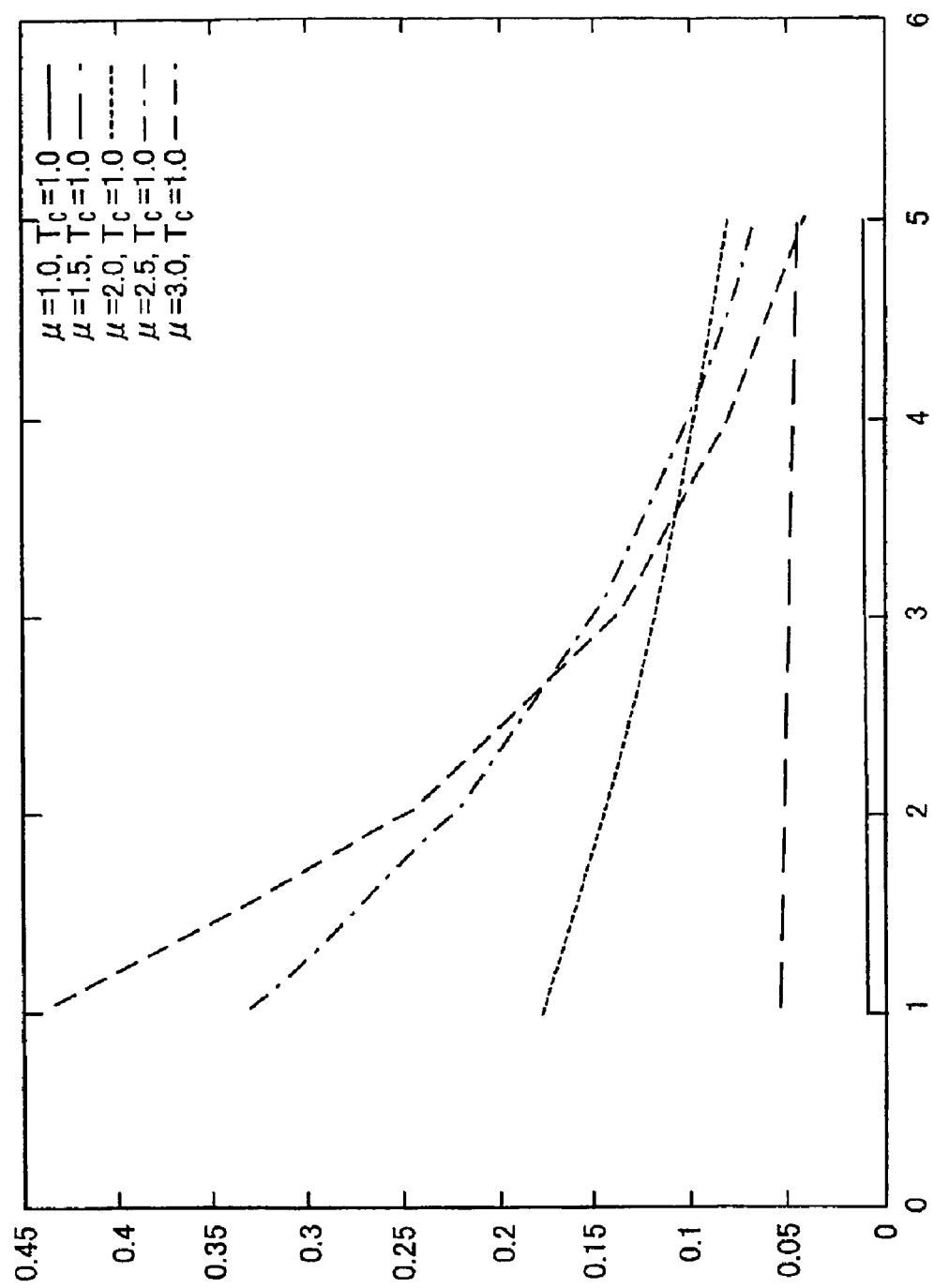
FIG. 29 is a graph showing the probability whereat, using detection method [5], non-matching can be first detected at a location M bits beyond the border of speech or music contents.

FIG. 29 is a graph obtained, when $T_c=1.0$ and D=5, by plotting the probability $P_{c4}$ whereat relative to the number of bits on the far side of the border a non-match will be first detected at that location. A non-match will be detected accurately within a range of D bits at most. When the border is not detected within this range, detecting the border using this method fails, and the losing rate is high.

Figure 30:
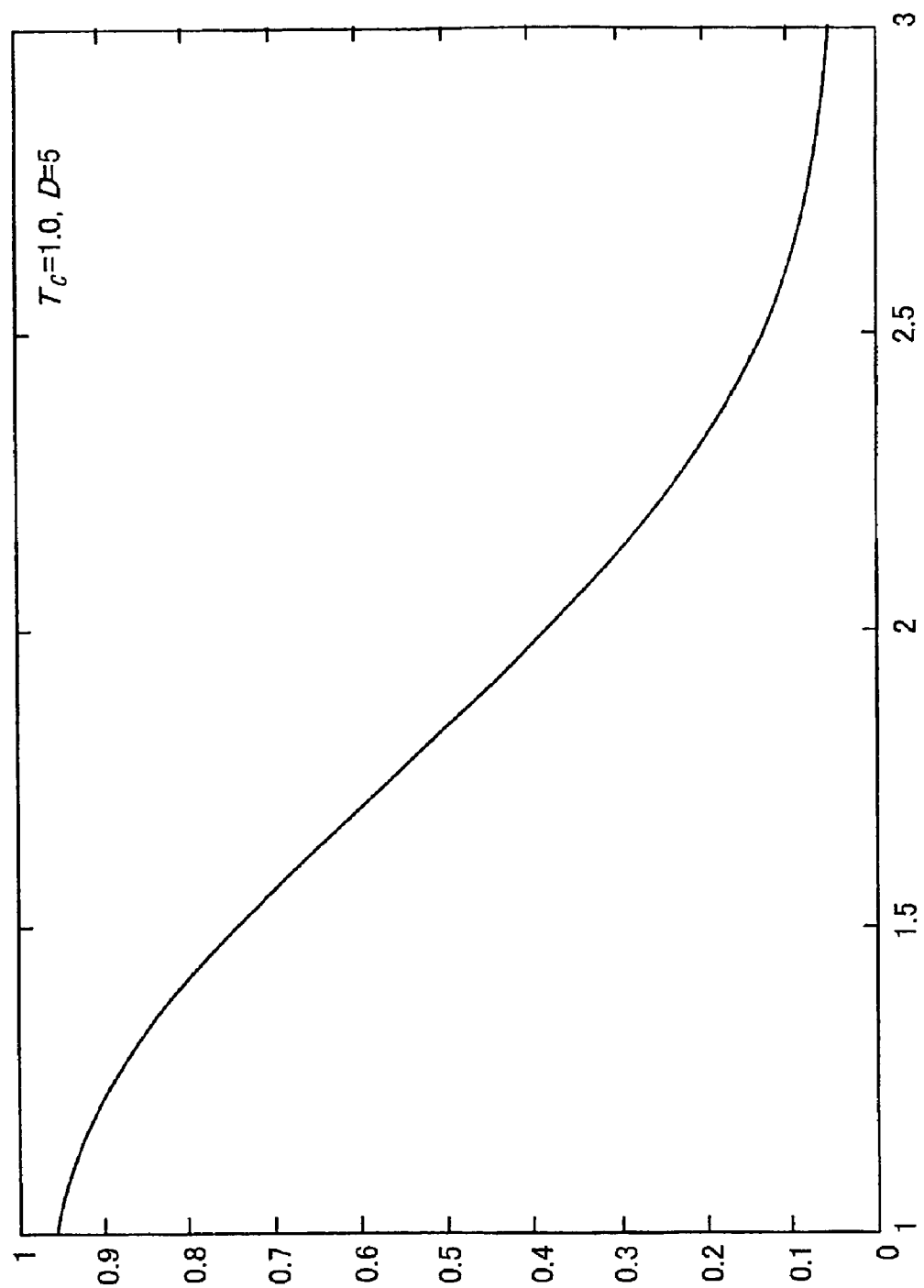
FIG. 30 is a graph showing, for detection method [5], the losing rate to the average of the detection strengths of bits used as a digital watermark.
Figure 31:
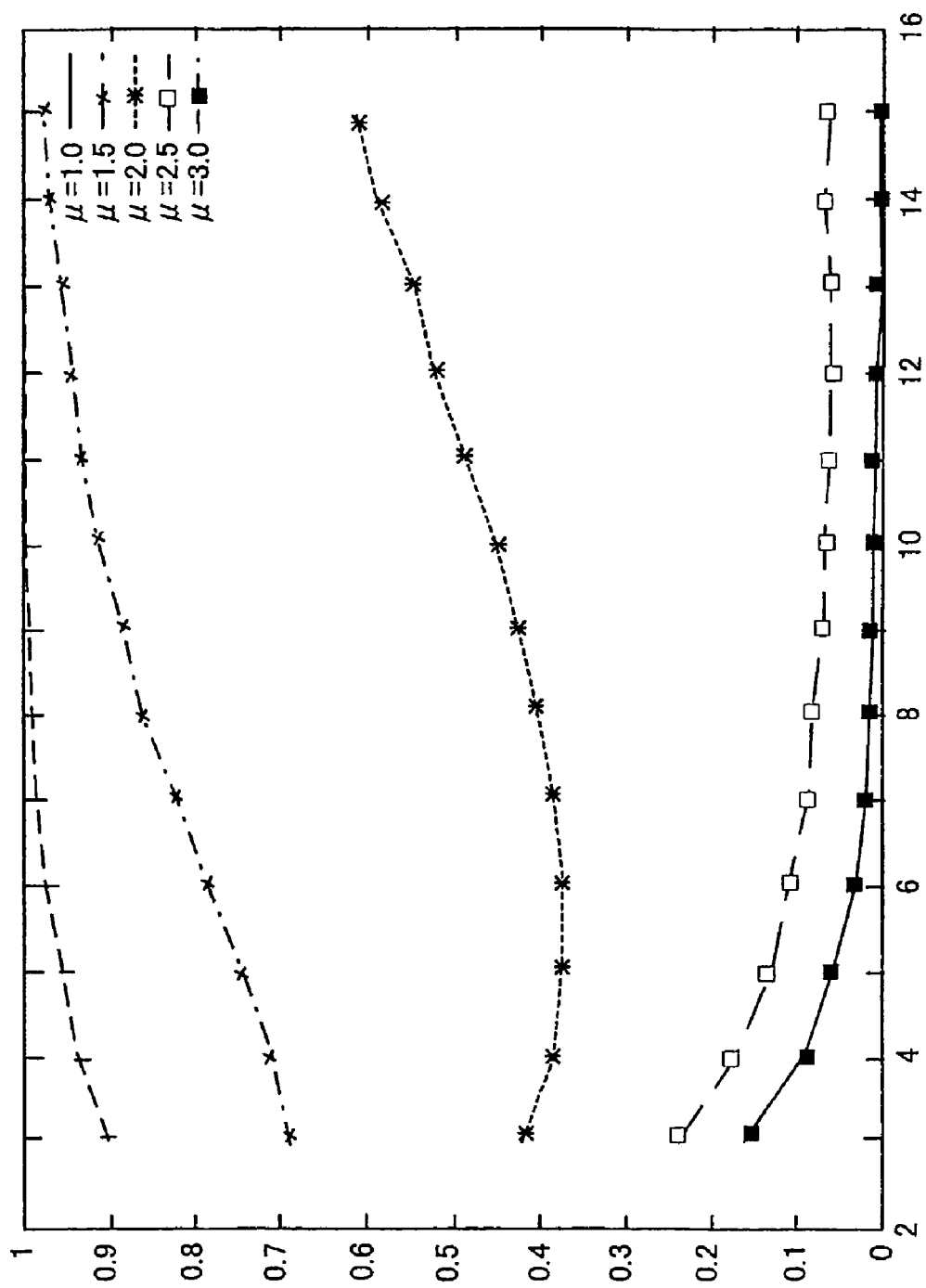
FIG. 31 is a graph showing, for detection method [5], the losing rate to the order of the sequence of M border detection bits.

FIG. 30 is a graph obtained by plotting the probability whereat the border will not be found for $\mu$ when $T_c=1.0$ and D=5. And FIG. 31 is a graph obtained by plotting the probability whereat the border will not be found within a range of D bits when $T_c=1.0$ For speech or music contents for which the detected value of a border detection bit is high, the losing rate can be reduced by increasing D (in this case, however, detection accuracy is lost). Whereas when the detected value of the border detection bit is small, due to the deterioration of the speech or music contents, and D is increased, the probability whereat all the bits will reach the threshold value is reduced, and on the contrary, the losing rate is further increased.

The five methods for detecting the border of the speech or music contents have been explained. As is described above, the reliability and the accuracy attained in the identification of a border of speech or music contents differs for the detection methods [1] to [5]. Therefore, in this embodiment, these detection methods are employed together to reliably and accurately identify the border of speech or music contents.

A specific method for this embodiment will now be described.

Figure 32:
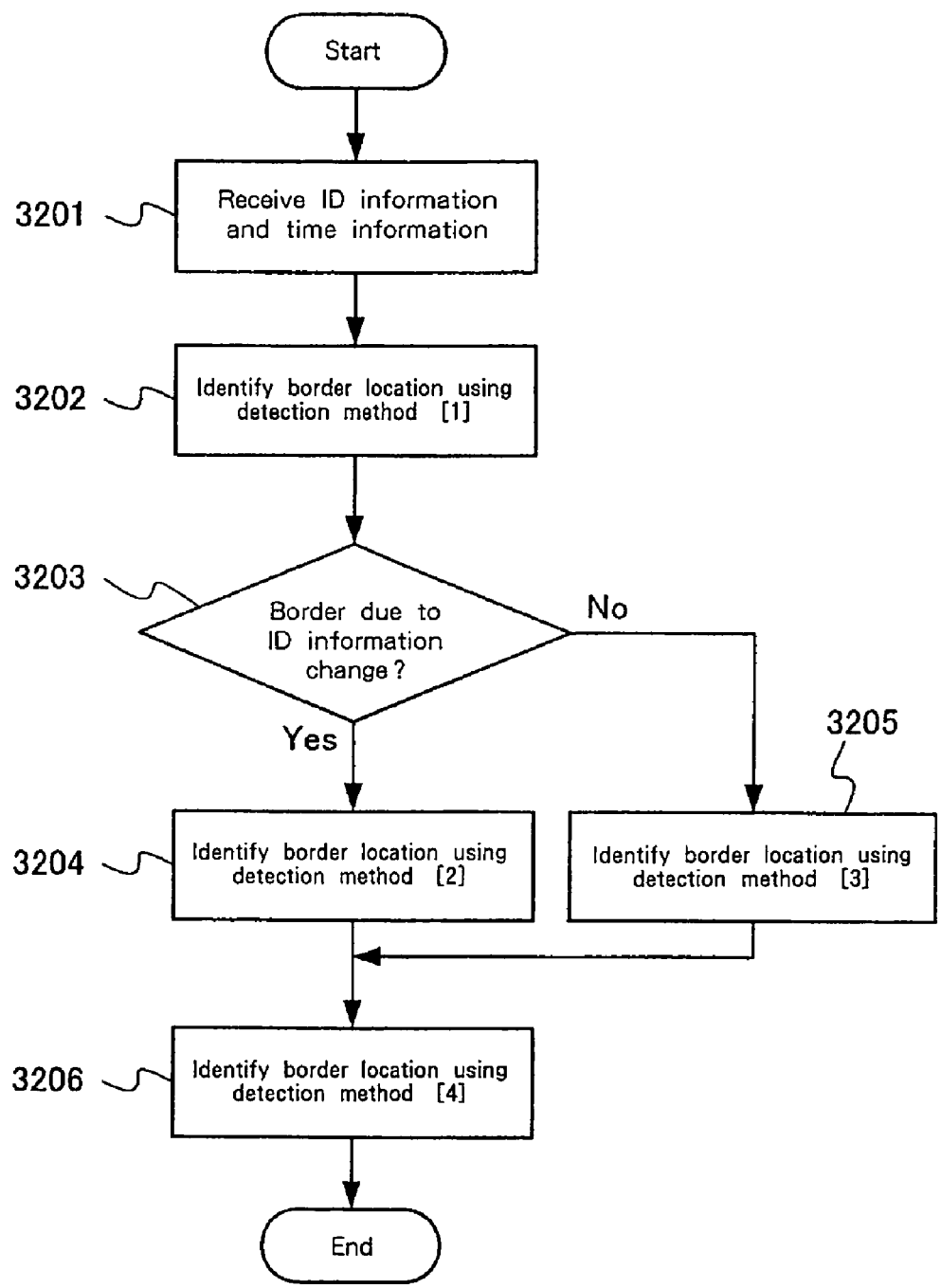
FIG. 32 is a flowchart for explaining the processing performed by the border detector of this embodiment to designate the border location of speech or music contents.

FIG. 32 is a flowchart for explaining the processing performed by the border detector 12 in FIG. 2 to designate the location of the border of speech or music contents. For this processing, the above described detection methods [1] to [4] are employed.

Before the processing is performed by the border detector 12, the digital watermark detector 11 detects a digital watermark in the speech or music data to be processed.

In FIG. 32, the border detector 12 receives the ID information detected by the digital watermark detector 11 and the detection time (step 3201), and employs detection method [1] to identify the location of the border of the speech or music contents (step 3202).

As is described above, since the detected ID information is employed for the detection method [1], the reliability is high, while the accuracy is low because the location designated as the border of the speech or music contents has a specific time width. Thus, the border detector 12 employs another detection method to more specifically identify the border location designated using the detection method [1]. Specifically, the border detector 12 employs the detection results obtained by the detection method [1] to determine whether the detected border of the speech or music contents is either a border (a border (i) or (ii)) at the end or the beginning of speech or music contents, or a border (the border (iii)) when speech or music contents are switched and the ID information for a digital watermark is changed (step 3203).

When the border of the speech or music contents detected by the detection method [1] is the border (iii), the border detector 12 specifies the location of the border of the speech or music contents by using detection method [2], which is appropriate for the detection of this type of border (step 3204).

When the border of the speech or music contents detected by the detection method [1] is the border (i) or (ii), the border detector 12 specifies the location of the border of the speech or music contents by using the detection method [3], which is appropriate for the detection of this type of border (step 3205).

Since the bit data of the detected digital watermark and the detection strength are employed by detection methods [2] and [3], these methods are affected by the deterioration of the speech or music contents, and are inferior in reliability to the detection method [1]. However, since detection methods [2] and [3] are employed within the range that is determined by detection method [1] to be the border of the speech or music contents, high reliability can be obtained.

As is described above, according to the detection method [2], theoretically the border of the speech or music contents can be identified by the one bit unit that represents the ID information that is embedded as a digital watermark. Actually, however, several bits in the ID information before and after the border may be providentially matched, and the location determined to be the border may be shifted forward, beyond the actual border location, a distance of several bits.

Further, since with detection method [3] the presence/absence of speech or music contents is determined based on the distribution of the detection strengths of the bits of the digital watermark that are detected, the time width is much smaller than is the time width for detection method [1]. However, an adequate number of bits is required to obtain the distribution of the detection strengths.

Therefore, for the border location choices obtained using detection methods [2] and [3], the border detector 12 employs detection method [4] to specify the location of the border of the speech or music contents (step 3206).

As is described above, according to detection method [4], the location of the border of the speech or music contents is determined based on the synchronized positions employed for the embedding and the detection of a digital watermark. Therefore, the border of the speech or music contents can be determined very accurately using the intervals whereat the synchronization signals appear.

Since detection method [4] is affected by the deterioration of speech or music contents, its reliability is low. However, when detection method [4] is employed within the range that is determined by detection methods [1], [2] and [3] to be the border of the speech or music contents, high reliability can also be obtained.

The process employed to detect the border of a digital watermark using detection methods [1] to [4] has been explained. These detection methods can be employed so long as a specific digital watermark is embedded in the speech or music contents. Therefore, the location of the border of the speech or music contents can be identified by using a digital watermark that is embedded as ID information.

The above described processing is merely an example. For instance, an appropriate threshold value may be dynamically set for the search performed for the location of the border, and detection method [2] may be employed instead of detection method [3]. Further, when in accordance with the speech or music contents or the ID information embedded therein the accuracy obtained by detection methods [2] and [3] is satisfactory, using detection method [4] to designate the location of the border will not be required.

Furthermore, when a special bit for the detection of the location of a border is embedded in speech or music contents, detection method [5] can be used to detect the location of the border of the speech or music contents. According to detection method [5], so long as the speech or music contents are not deteriorated, the border location can be specified using a one bit unit, and thus, detection method [5] can be employed instead of detection methods [2] and [3], or the three methods may be employed together. When detection methods [2], [3] and [5] are used together, not much improvement in the accuracy can be expected, but the reliability of the detection results can be increased because more detection methods are employed.

In the above embodiment, the results of the detection of the digital watermark that is embedded in the speech or music contents are processed to determine a border location, such as the location whereat speech or music contents are switched and the locations whereat the speech or music contents end and begin. The thus obtained border location and the time information that is obtained when the digital watermark detector 11 detects a digital watermark can be employed to specify the location along the time axis of predetermined speech or music contents in the speech or music data. Therefore, when this time location is employed for broadcast monitoring, the length of time that the speech or music contents occupy in the broadcast data can be specified, and when and how long pertinent speech or music contents were broadcast can be examined.

However, the actual border location of the speech or music contents may not be clear for some broadcast speech or music data. For example, predetermined speech or music contents are ended with a fade-out, and at the same time other speech or music contents are started with a fade-in.

In this case, since there is a portion where two speech or music contents are overlapped during the fade-out and the fade-in, a clear border can not be identified by using any of the detection methods in this embodiment (when, for example, detection methods [1] and [2] are employed, the location whereat the digital watermark of the current speech or music contents is first detected and the location whereat the digital watermark of the preceding speech or music contents is no longer detected are determined to be the border of the speech or music contents).

In this case, as a rule a location is defined in advance as the border of the speech or music contents, and in accordance with this rule, the border of the speech or music contents is specified. For example, the middle point between the last location whereat the ID information for the preceding speech or music contents is detected and the first location whereat the ID information for the current speech or music contents is detected (the middle point in the range within which the two speech or music contents are overlapped) can be defined as the border of the speech or music contents.

Furthermore, when multiple speech or music contents are synthesized and broadcast, two digital watermarks are detected, as was described for the example where the speech or music contents were switched using a fade-in and a fade-out. Therefore, none of the detection methods of this embodiment can specify the location of the border for one set of speech or music contents. Therefore, the methods of this embodiment are applied for the detection of the location of a border only when one set of speech or music contents is included in the one set of speech or music data that is broadcast.

In this embodiment, the detection of the location of the border of speech or music contents has been explained. However, by using a digital watermark that is embedded as the ID information for the contents, the detection methods of the embodiment can be applied for video contents for moving pictures or for other contents, such as the audio portion of the video and speech or music contents, which include a time element.

Advantage of the Invention

As is described above, according to the present invention, multiple methods can be employed to identify the border of speech or music contents based on a digital watermark that is detected in the contents, so that both reliability and the accuracy can be provided for the identification of the location of the border of the contents.

What is claimed is:

1. A contents border detection apparatus comprising:
a digital watermark detector, for detecting a digital watermark embedded in contents for which a time element is provided; and
a border detector, for detecting border locations for said contents corresponding to the state of said digital watermark detected by said digital watermark detector,
wherein said border detector includes
first border specification means, for specifying said border locations for said contents based on information, written in said digital watermark, that is detected by said digital watermark detector, and
second border specification means, for specifying said border locations for said contents based on bit patterns embedded as said digital watermark,
wherein said border locations for said contents are detected by using the process results obtained both by said first and said second border specification means.

2. The contents border detection apparatus according to claim 1, wherein said border detector includes:
third border specification means, for specifying said location of said border of said contents based on the appearance pattern of a synchronization signal used for the detection of said digital watermark,
wherein said location of said border of said contents is detected by using the process results obtained by both said first and said second border specification means and the process results obtained by said third border specification means.

3. A contents border detection apparatus comprising:
a digital watermark detector, for detecting a digital watermark embedded in contents for which a time element is provided; and
a border detector, for detecting border locations for said contents corresponding to the state of said digital watermark detected by said digital watermark detector,
wherein said border detector includes
first border specification means, for specifying said border locations for said contents based on information, written in said digital watermark, that is detected by said digital watermark detector, and
second border specification means, for specifying said border locations for said contents based on detection strengths of bits embedded as said digital watermark,
wherein said border locations for said contents are detected by using the process results obtained both by said first and said second border specification means.

4. The contents border detection apparatus according to claim 3, wherein said border detector includes:
third border specification means, for specifying said location of said border of said contents based on the appearance pattern of a synchronization signal used for the detection of said digital watermark,
wherein said location of said border of said contents is detected by using the process results obtained by both said first and said second border specification means and the process results obtained by said third border specification means.

5. A contents border detection apparatus comprising:
a digital watermark detector, for detecting a digital watermark embedded in contents including a time element; and
a border detector, for detecting the location of the border of said contents in accordance with the state of said digital watermark detected by said digital watermark detector,
wherein said border detector predicts the detection results for a predetermined bit based on a bit string segment, having a specific length, of a predetermined bit string that is embedded as a digital watermark in said contents, and depending on whether the actual detection results obtained for said predetermined bit match the prediction results, identifies said location of said border of said contents.

6. The contents border detection apparatus according to claim 5, wherein, when an M sequence bit string is repetitively embedded as a digital watermark in said contents, said border detector employs a predetermined M sequence to predict the results obtained for a bit that is detected adjacent to said M sequence bit string, and employs the prediction results to specify the location of the border of said contents.

7. A monitoring method for specifying the time occupied by predetermined contents in broadcast data, including a variety of types of contents, comprising the steps of:
detecting a digital watermark embedded in said contents of said broadcast data;
employing the state of said digital watermark to detect the location of the border of said contents in said broadcast data; and
employing said location of said border of said contents to designate the period of time that said contents occupy in said broadcast data,
wherein said step of detecting said location of said border of said contents includes the steps of
performing a first method, based on information written in said digital watermark, to identify said location of said border of said contents in which said digital watermark is embedded,
employing a second method, based on information related to a bit embedded as a digital watermark, to specify the location of the border of said contents more accurately than is possible with said first method, based on said location of said border designated by said first method.

8. The monitoring method according to claim 7, wherein said step of detecting said location of said border of said contents includes the step of:
employing a third method, based on an appearance pattern for a synchronization signal used for the detection of said digital watermark, to designate said location of said border of said contents more accurately than is possible with said second method, based on said location of said border specified using said second method.

9. The monitoring method according to claim 7, wherein said step of specifying said location of said border of said contents using said second method includes the steps of:
predicting detection results for a predetermined bit based on a bit string segment, having a specific length, of a predetermined bit string that is embedded as a digital watermark in said contents; and
designating said location of said border of said contents based on whether the actual detection results for said predetermined bit match the predicted results.

10. A monitoring method for specifying the time occupied by predetermined contents in broadcast data, including a variety of types of contents, comprising the steps of:
detecting a digital watermark embedded in said contents of said broadcast data;
employing the pattern of bits embedded as said digital watermark to detect the location of the border of said contents in said broadcast data; and
employing said location of said border of said contents to designate the period of time that said contents occupy in said broadcast data.

11. A monitoring method for specifying the time occupied by predetermined contents in broadcast data, including a variety of types of contents, comprising the steps of:
detecting a digital watermark embedded in said contents of said broadcast data;
employing the detection strengths of bits embedded as said digital watermark to detect the location of the border of said contents in said broadcast data; and
employing said location of said border of said contents to designate the period of time that said contents occupy in said broadcast data.

12. A contents location detection method for detecting the location, along the time axis, of predetermined speech or music contents in speech or music data comprising the steps of:
detecting a digital watermark embedded in said speech or music contents of said speech or music data;
employing a first method based on information written in said digital watermark to specify the location of the border of said speech or music contents in which said digital watermark is embedded; and
employing a second method, based on the detection strength of a bit embedded as said digital watermark, to specify the location of the border of said speech or music contents more accurately than by said first method, based on said location of said border designated using said first method.

13. The contents location detection method according to claim 12, further comprising the step of:
employing a third method, based on an appearance pattern for a synchronization signal used for the detection of said digital water-mark, to designate said location of said border of said speech or music contents more accurately than is possible with said second method, based on said location of said border specified using said second method.

14. The contents location detection method according to claim 12, wherein said step of specifying said location of said border of said speech or music contents using said second method includes the steps of:
predicting detection results for a predetermined bit based on a bit string segment, having a specific length, of a predetermined bit string that is embedded as a digital watermark in said speech or music contents; and
designating said location of said border of said speech or music contents based on whether the actual detection results for said predetermined bit match the predicted results.

* * * * *

UNITED STATES PATENT AND TRADEMARK OFFICE
CERTIFICATE OF CORRECTION

| | |
|---|---|
| PATENT NO. | : 7,606,388 B2 |
| APPLICATION NO. | : 10/477243 |
| DATED | : October 20, 2009 |
| INVENTOR(S) | : Tachibana et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1068 days.

Signed and Sealed this

Twelfth Day of October, 2010

David J. Kappos
*Director of the United States Patent and Trademark Office*